（12） United States Patent
Haprian et al.

(10) Patent No.: US 11,989,178 B2
(45) Date of Patent: May 21, 2024

(54) EFFICIENT COMPILATION OF GRAPH QUERIES INCLUDING COMPLEX EXPRESSIONS ON TOP OF SQL BASED RELATIONAL ENGINE

(71) Applicant: Oracle International Corporation, Redwood Shores, CA (US)

(72) Inventors: Vlad Haprian, Zurich (CH); Laurent Daynes, Saint-Ismier (FR); Zhen Hua Liu, San Mateo, CA (US); Lei Sheng, Foster City, CA (US); Hugo Kapp, Zurich (CH); Marco Arnaboldi, Zurich (CH); Jean-Pierre Lozi, Zurich (CH); Andrew Witkowski, Foster City, CA (US); Hassan Chafi, San Mateo, CA (US); Sungpack Hong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 17/080,700

(22) Filed: Oct. 26, 2020

(65) Prior Publication Data
US 2022/0129461 A1  Apr. 28, 2022

(51) Int. Cl.
*G06F 16/2453* (2019.01)
*G06F 16/2455* (2019.01)
*G06F 16/901* (2019.01)

(52) U.S. Cl.
CPC .. *G06F 16/24537* (2019.01); *G06F 16/24558* (2019.01); *G06F 16/9024* (2019.01)

(58) Field of Classification Search
CPC ......... G06F 16/24537; G06F 16/24558; G06F 16/9024; G06F 16/2452; G06F 16/24556; G06F 16/2456; G06F 16/24526
See application file for complete search history.

(56) References Cited

U.S. PATENT DOCUMENTS

| 5,379,419 | A | 1/1995 | Heffernan et al. |
| 5,983,215 | A | 11/1999 | Ross et al. |
| 6,006,233 | A | 12/1999 | Schultz |
| 6,081,801 | A | 6/2000 | Cochrane et al. |
| 7,580,947 | B2 | 8/2009 | Kasravi |

(Continued)

FOREIGN PATENT DOCUMENTS

| CN | 107807983 A | 3/2018 |
| WO | WO9945479 A1 | 9/1999 |

OTHER PUBLICATIONS

Yousfi, U.S. Appl. No. 16/431,294, filed Jun. 4, 2019, Office Action, dated Apr. 6, 2020.

(Continued)

*Primary Examiner* — Mark D Featherstone
*Assistant Examiner* — Kweku William Halm
(74) *Attorney, Agent, or Firm* — Hickman Becker Bingham Ledesma LLP

(57) ABSTRACT

Techniques support graph pattern matching queries inside a relational database management system (RDBMS) that supports SQL execution. The techniques compile a graph pattern matching query into a SQL query that can then be executed by the relational engine. As a result, techniques enable execution of graph pattern matching queries on top of the relational engine by avoiding any change in the existing SQL engine.

44 Claims, 8 Drawing Sheets

(56) References Cited

U.S. PATENT DOCUMENTS

| | | | |
|---|---|---|---|
| 7,624,081 | B2 | 11/2009 | Zhao et al. |
| 7,849,106 | B1 | 12/2010 | Agrawal et al. |
| 8,996,492 | B2 | 3/2015 | Paradies et al. |
| 9,116,738 | B2 | 8/2015 | Jacob et al. |
| 9,122,513 | B2 | 9/2015 | Jacob et al. |
| 9,195,941 | B2 | 11/2015 | Mojsilovic et al. |
| 9,495,477 | B1 | 11/2016 | Dehnert et al. |
| 10,019,536 | B2 | 7/2018 | Hong et al. |
| 10,235,474 | B2 | 3/2019 | Haubenschild |
| 10,346,138 | B1 | 7/2019 | Quillen |
| 10,452,655 | B2 | 10/2019 | Lahorani et al. |
| 10,984,046 | B2 | 4/2021 | Das et al. |
| 11,514,219 | B1 | 11/2022 | Abo Foul et al. |
| 11,537,579 | B2 | 12/2022 | Lozi et al. |
| 11,704,313 | B1 | 7/2023 | Andrade et al. |
| 2002/0178341 | A1 | 11/2002 | Frank |
| 2002/0184225 | A1 | 12/2002 | Ghukasyan |
| 2003/0195885 | A1 | 10/2003 | Emmick |
| 2004/0133747 | A1 | 7/2004 | Coldewey |
| 2005/0160432 | A1 | 7/2005 | Gallagher |
| 2006/0101001 | A1* | 5/2006 | Lindsay ............ G06F 16/24537 |
| 2008/0071754 | A1 | 3/2008 | Muras |
| 2008/0177722 | A1 | 7/2008 | Lohman |
| 2008/0184197 | A1* | 7/2008 | Dobbins ................. G06F 8/425 717/108 |
| 2008/0281801 | A1 | 11/2008 | Larson et al. |
| 2009/0006450 | A1 | 1/2009 | Champion |
| 2010/0088666 | A1* | 4/2010 | Box ........................ G06F 8/437 717/104 |
| 2011/0119245 | A1 | 5/2011 | Sargeant et al. |
| 2011/0270861 | A1* | 11/2011 | Arshavsky ........ G06F 16/24534 707/769 |
| 2011/0307685 | A1 | 12/2011 | Song |
| 2013/0212131 | A1 | 8/2013 | Reddy |
| 2013/0332387 | A1 | 12/2013 | Mirra et al. |
| 2014/0019490 | A1 | 1/2014 | Roy et al. |
| 2014/0032617 | A1 | 1/2014 | Stanfill |
| 2014/0136553 | A1 | 5/2014 | Jacob et al. |
| 2014/0136555 | A1 | 5/2014 | Jacob et al. |
| 2014/0137129 | A1 | 5/2014 | Jacob et al. |
| 2014/0137130 | A1* | 5/2014 | Jacob ........................ G06F 9/46 718/103 |
| 2014/0310232 | A1 | 10/2014 | Plattner et al. |
| 2015/0026158 | A1 | 1/2015 | Jin |
| 2015/0081741 | A1 | 3/2015 | Xu |
| 2015/0120775 | A1 | 4/2015 | Shao et al. |
| 2015/0143179 | A1 | 5/2015 | Desai |
| 2015/0169757 | A1 | 6/2015 | Kalantzis |
| 2015/0310644 | A1 | 10/2015 | Zhou et al. |
| 2015/0379054 | A1 | 12/2015 | Kernert |
| 2016/0071233 | A1 | 3/2016 | Macko et al. |
| 2016/0078344 | A1 | 3/2016 | Agarwal et al. |
| 2016/0103931 | A1 | 4/2016 | Appavu |
| 2016/0117358 | A1 | 4/2016 | Schmid et al. |
| 2016/0140152 | A1 | 5/2016 | Sevenich et al. |
| 2016/0171068 | A1 | 6/2016 | Hardin |
| 2016/0179883 | A1 | 6/2016 | Chen |
| 2016/0179887 | A1 | 6/2016 | Lisonbee et al. |
| 2016/0188656 | A1 | 6/2016 | Ekanadham et al. |
| 2016/0299991 | A1 | 10/2016 | Hong et al. |
| 2016/0342708 | A1* | 11/2016 | Fokoue-Nkoutche ........................ G06F 16/9024 |
| 2017/0031976 | A1 | 2/2017 | Chavan et al. |
| 2017/0046388 | A1 | 2/2017 | Kirk et al. |
| 2017/0068748 | A1 | 3/2017 | Hu et al. |
| 2017/0147705 | A1* | 5/2017 | Kasperovics ....... G06F 16/2433 |
| 2017/0147706 | A1 | 5/2017 | Roth et al. |
| 2017/0169133 | A1* | 6/2017 | Kim .................. G06F 16/9024 |
| 2017/0220271 | A1 | 8/2017 | Muthukrishnan |
| 2017/0293697 | A1 | 10/2017 | Youshi et al. |
| 2018/0067987 | A1 | 3/2018 | Kang et al. |
| 2018/0096000 | A1 | 4/2018 | Harrison et al. |
| 2018/0096035 | A1 | 4/2018 | Kreutzer et al. |
| 2018/0137667 | A1 | 5/2018 | Kindelsberger et al. |
| 2018/0218088 | A1 | 8/2018 | Fischer et al. |
| 2018/0246986 | A1 | 8/2018 | Haubenschild et al. |
| 2018/0293329 | A1* | 10/2018 | Yanagisawa ........ G06F 16/9024 |
| 2019/0121825 | A1 | 4/2019 | Kim et al. |
| 2019/0179752 | A1 | 6/2019 | Yoo et al. |
| 2019/0205480 | A1* | 7/2019 | Zhang ................. G06F 16/9024 |
| 2019/0213356 | A1 | 7/2019 | Vagujhelyi et al. |
| 2019/0303506 | A1 | 10/2019 | Bross et al. |
| 2019/0311060 | A1* | 10/2019 | Bross .................. G06F 16/9024 |
| 2019/0325075 | A1 | 10/2019 | Hilloulin et al. |
| 2020/0059481 | A1 | 2/2020 | Sekar et al. |
| 2020/0226053 | A1 | 7/2020 | Meibusch et al. |
| 2020/0226124 | A1 | 7/2020 | Chishti et al. |
| 2020/0265049 | A1 | 8/2020 | da Trindade et al. |
| 2020/0364268 | A1* | 11/2020 | Xu ...................... G06F 16/9024 |
| 2021/0004374 | A1 | 1/2021 | Xia et al. |
| 2021/0034615 | A1* | 2/2021 | Chen .................. G06F 16/2452 |
| 2021/0064660 | A1* | 3/2021 | Xu ........................ G06F 16/903 |
| 2021/0064661 | A1 | 3/2021 | Jung et al. |
| 2021/0149854 | A1* | 5/2021 | Barde ..................... H04L 63/08 |
| 2021/0256063 | A1* | 8/2021 | Kasperovics ....... G06F 16/9024 |
| 2022/0114178 | A1 | 4/2022 | Haprian et al. |
| 2022/0129451 | A1 | 4/2022 | Haprian et al. |
| 2022/0129465 | A1 | 4/2022 | Haprian et al. |
| 2022/0245147 | A1 | 8/2022 | Segalini et al. |
| 2022/0277021 | A1 | 9/2022 | Cruanes et al. |
| 2022/0284056 | A1 | 9/2022 | Hilloulin et al. |

OTHER PUBLICATIONS

Yousfi, U.S. Appl. No. 16/431,294, filed Jun. 4, 2019, Notice of Allowance, dated Jan. 8, 2021.

Yousfi, U.S. Appl. No. 16/431,294, filed Jun. 4, 2019, Final Office Action, dated Jul. 8, 2020.

Yousfi, U.S. Appl. No. 16/431,294, filed Jun. 4, 2019, Advisory Action, dated Sep. 24, 2020.

Yousfi, U.S. Appl. No. 15/096,034, filed Apr. 11, 2016, Office Action, dated Apr. 10, 2018.

Yousfi, U.S. Appl. No. 15/096,034, filed Apr. 11, 2016, Notice of Allowance, dated Feb. 14, 2019.

Yousfi, U.S. Appl No. 15/096,034, filed Apr. 11, 2016, Interview Summary, dated Nov. 23, 2018.

Yousfi, U.S. Appl. No. 15/096,034, filed Apr. 11, 2016, Final Office Action, dated Sep. 20, 2018.

Yousfi, U.S. Appl. No. 15/096,034, filed Apr. 11, 2016, Advisory Action, dated Dec. 5, 2018.

SAP HANA, "Graph Workspaces," https://help.sap.com/viewer/f381aa9c4b99457fb3c6b53a2fd29c02/2.0.03/en-US, 1pg.

Zemke, Fred, "Fixed Graph Patterns", ANSI INCITS DM32.2-2018-00153r1, dated Sep. 14, 2018, 25 pages.

TigerGraph, "The Only Scalable Graph Database for the Enterprise", https://www.tigergraph.com/, last viewed on Nov. 4, 2020, 9 pages.

PGQL, "Property Graph Query Language", http://pgql-lang.org/, last viewed on Nov. 3, 2020, 5 pages.

Neo4j Graph Platform, "What is Neo4j?", https://neo4j.com/, last viewed on Nov. 4, 2020, 14 pages.

Neo4j Graph Database Platform, "Cypher Query Language", https://neo4j.com/developer/cypher/, dated Nov. 4, 2020, 7 pages.

Michels, Jan, "Property Graph Data Model, The Proposal", ANSI INCITS DM32.2-2018-00190r1, dated Jan. 16, 2019, 76 pages.

Databricks, "Graphs Analysis Tutorial with GraphFrames", dated Jul. 21, 2020, https://docs.databricks.com/spark/latest/graph-analysis/graphframes/graph-analysis-tutorial.html, 2 pages.

Apache TinkerPop, "The Gremlin Grpah Traversal Machine and Language", tinkerpop.apache.org/gremlin.html, last viewed on Nov. 4, 2020, 6 pages.

Amazon Neptune, "Overview" https://aws.amazon.com/neptune/, last viewed on Nov. 4, 2020, 20 pages.

Haprian, U.S. Appl. No. 17/162,564, filed Jan. 29, 2021, Non-Final Rejection, dated Feb. 3, 2022.

Haprian, U.S. Appl. No. 17/080,719, filed Oct. 26, 2020, Non-Final Rejection, dated Dec. 14, 2021.

(56) References Cited

OTHER PUBLICATIONS

Haprian, U.S. Appl. No. 17/080,698, filed Oct. 26, 2020, Non-Final Rejection, dated Dec. 24, 2021.
Tian et al., "IBM Db2 Graph: Supporting Synergistic and Retrofittable Graph Queries Inside IBM Db2", SIGMOD '20: Proceedings of the 2020 ACM SIGMOD International Conference on Management of Data, Jun. 2020, 15 pages.
SAP.com "Get Started with SAP HANA Graph", available: https://developers.sap.com/group.hana-aa-graph-overview.html, 4 pages.
Deutsch et al., "TigerGraph: A Native MPP Graph Database", Jan. 24, 2019, 28 pages.
Annamalai et al., "PGQL Introduction and Deep Dive", Product Management, Oracle, Jul. 30, 2020, 45 pages.
Adam et al. "A Comparison of List Schedules for Parallel Processing Systems", Communications of the ACM 17(12):685-690, Dec. 1974, pp. 685-690.
SAP.com, "SAP HANA", Harness the power of an in-memory database with SAP HANA, SAP Business Technology Platform, https://www.sap.com/products/hana.html, last viewed on Jan. 29, 2021, 19 pages.
Graph Query Language GQL, "GQL Standard", https://www.gqlstandards.org/home, last viewed on Jan. 29, 2021, 2 pages.
Hassan et al., "Extended In-Memory Relational Database Engines with Native Graph Support", Proceedings of the 21st International Conference on Extending Database Technology, dated Mar. 2018, 12 pgs.
Heer et al., "Software Design Patterns for Information Visualization", IEEE Transactions on Visualization and Computer Graphics, vol. 12, dated Sep. 2006, 8 pages.
Hong et al., "PGX.D: A fast Distributed Graph Processing Engine", SC '15, dated Nov. 15-20, 2015, Austin, TX, USA, 12 pages.
Kaur, Sawinder, "Visualizing Class Diagram Using OrientDB NoSQL Data-Store", dated Jul. 2016, 5 pages.
Microsoft Docs, "Graph Processing with SQL Server and Azure SQL Database",docs.microsoft.com/en-us/sql/relational databases/graphs/sql-graph-overview?view=sql-server-ver15, dated Jun. 26, 2019, 5 pgs.
Microsoft.com, "SQL Server 2019"https://www.microsoft.com/en-us/sql-server/sql-server-2019, last viewed on Jan. 29, 2021, 8 pages.
Oracle, "Using Property Graphs in an Oracle Database Environment", docs.oracle.com/database/122/SPGDG/using-property-graphs-oracle database. htm#BDSPA191, Apr. 23, 2018, 152 pages.
De Virgilio et al., "Converting Relational to Graph Databases", Proceedings of the First International Workshop on Graph Data Management Experience and Systems (GRADES 2013), Jun. 23, 2013, 6 pages.
Sap.com, "SAP HANA Graph Reference", SAP HANA Platform 2.0 SPS 03 Document Version: 1.1 dated Oct. 31, 2018, 84 pages.
Xirogiannopoulos et al., "GraphGen: Exploring Interesting Graphs in Relational Data", Proceedings of the VLDB Endowment, vol. 8, No. 12 Copyright 2015 VLDB Endowment, 4 pages.
Segalini et al., "Patent: efficient identification of vertices and edges for graph indexes in an RDBMS", dated Nov. 2015, 12 pages.
SQL Server Blog, "Graph Data Processing with SQL Server 2017 and Azure SQL Database", dated Aug. 20, 2017, 8 pages.
Wikipedia, the free encyclopedia, "Bellman-Ford algorithm", https://en.wikipedia.org/wiki/Bellman%E2%80%93Ford_algorithm, last viewed on Jan. 29, 2021, 6 pages.
Wikipedia, the free encyclopedia, "Fetch-and-add", https://en.wikipedia.org/wiki/Fetch-and-add, last viewed on Jan. 29, 2021, 4 pages.
Wikipedia, the free encyclopedia, "Isolation (database systems)", https://en.wikipedia.org/wiki/Isolation_(database_systems), last viewed on Jan. 29, 2021, 8 pages.
Wikipedia, the free encyclopedia, "PageRank", https://en.wikipedia.org/wiki/PageRank, last viewed on Jan. 29, 2021, 16 pages.
Wikipedia, the free encyclopedia, "Subgraph isomorphism problem", https://en.wikipedia.org/wiki/Subgraph_isomorphism_problem, last viewed on Jan. 29, 2021, 4 pages.
Xirogiannopoulos et al., "Extracting and Analyzing Hidden Graphs from Relational Databases", ACM, SIGMOD dated 2017, 18 pages.
Perez et al., Ringo: Interactive Graph Analytics on Big-Memory Machines:, Proc ACM SIGMOD Int Conference Manag Data. Dated May-Jun. 2015, 21 pages.
Nagel et al., "Recycling in Pipelined Query Evaluation", 29th International Conference on Data Engineering (ICDE), 2013, 13 pages.
Segalini et al., U.S. Appl. No. 17/162,527, filed Jan. 29, 2021, Notice of Allowance and Fees Due, dated Jun. 24, 2022.
Haprian, U.S. Appl. No. 17/162,564, filed Jan. 29, 2021, Final Rejection, dated Jun. 13, 2022.
Haprian, U.S. Appl. No. 17/080,719, filed Oct. 26, 2020, Notice of Allowance and Fees Due, dated Jul. 7, 2022.
Haprian, U.S. Appl. No. 17/080,698, filed Oct. 26, 2020, Final Rejection, dated May 18, 2022.
Segalini, U.S. Appl. No. 17/162,527, filed Jan. 29, 2021, Non-Final Rejection, dated Mar. 17, 2022.
Segalini, U.S. Appl. No. 17/162,527, filed Jan. 29, 2021, Notice of Allowance and Fees Due, dated Aug. 5, 2022.
Hilloulin, U.S. Appl. No. 17/194,165, filed Mar. 5, 2021, Non-Final Rejection, dated Oct. 6, 2022.
Haprian, U.S. Appl. No. 17/080,719, filed Oct. 26, 2020, Notice of Allowance and Fees Due, dated Oct. 20, 2022.
Haprian, U.S. Appl. No. 17/080,719, filed Oct. 26, 2020, Notice of Allowance and Fees Due, dated Aug. 11, 2022.
Haprian, U.S. Appl. No. 17/080,698, filed Oct. 26, 2020, Notice of Allowance and Fees Due, dated Sep. 14, 2022.
Haprian, Vlad et al., "Efficient compilation of bounded recursive graph queries on top of SQL based relational engine", 5 pages.
Kapp, U.S. Appl. No. 17/584,262, filed Jan. 25, 2022, Non-Final Rejection, dated Jun. 23, 2023.
Haprian, U.S. Appl. No. 17/965,687, filed Oct. 13, 2022, Non-Final Rejection, dated Jun. 23, 2023.
Haprian, U.S. Appl. No. 17/162,564, filed Jan. 29, 2021, Final Rejection, dated May 15, 2023.
Stoica, Radu-Alexandru, "R2PG-DM: A Directly Mapping Relational Databases to Property Graphs", diss. Master's thesis, Eindhoven Univ. of Technology 2019, https://ceur-ws.org/Vol-2369/short06.pdf, Jul. 2019, 24pgs.
Jindal, Alekh et al. "Graph Analytics Using Vertica Relational Database", 2015 IEEE Intl Conf on Big Data (Big Data), Santa Clara, CA, pp. 1191-1200, doi: 10.1109/BigData.2015.7363873, Oct. 2015, 14 pgs.
Hassan, Mohammed S., et al., "Empowering In-Memory Relational Database Engines with Native Graph Processing", arXiv:1709.06715v2, Oct. 12, 2017, 15 pgs.
"SAP HANA Graph Reference", SAP HANA Platform 2.0 SPS 04 Document Version 1.1 dated Oct. 31, 2019 SAP.com, 86 pages.
U.S. Appl. No. 17/585,146, filed Jan. 26, 2022, Final Rejection, dated Oct. 12, 2023.
U.S. Appl. No. 17/585,146, filed Jan. 26, 2022, Advisory Action, dated Dec. 4, 2023.
U.S. Appl. No. 17/584,262, filed Jan. 25, 2022, Notice of Allowance and Fees Due, dated Oct. 12, 2023.
U.S. Appl. No. 17/194,165, filed Mar. 5, 2021, Non-Final Rejection, dated Oct. 24, 2023.
U.S. Appl. No. 17/965,687, filed Oct. 13, 2022, Final Rejection, dated Nov. 28, 2023.
U.S. Appl. No. 17/162,564, filed Jan. 29, 2021, Pre-Brief Appeal Conference decision, dated Oct. 6, 2023.
U.S. Appl. No. 17/162,564, filed Jan. 29, 2021, Advisory Action, dated Sep. 11, 2023.

\* cited by examiner

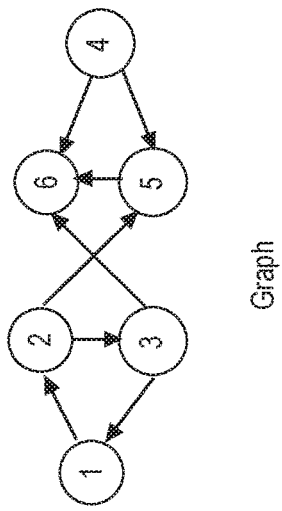
Fig. 1A
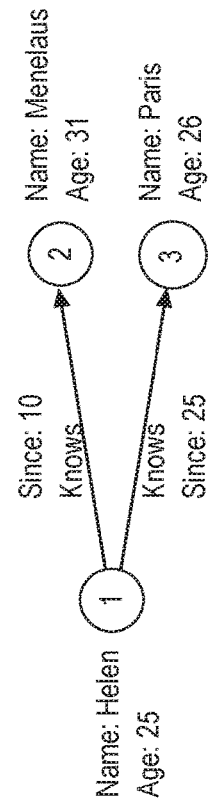
Fig. 1B
Fig. 1C
Persons Table
| Vertex ID | Name | Age |
|---|---|---|
| 1 | Helen | 25 |
| 2 | Menelaus | 31 |
| 3 | Paris | 26 |
Knows Table
| Edge ID | Source Vertex id | Destination Vertex ID | Since |
|---|---|---|---|
| 1 | 1 | 2 | 10 |
| 2 | 1 | 3 | 25 |

EFFICIENT COMPILATION OF GRAPH QUERIES INCLUDING COMPLEX EXPRESSIONS ON TOP OF SQL BASED RELATIONAL ENGINE

CROSS-REFERENCE TO RELATED APPLICATIONS

This application is related to U.S. patent application Ser. No. 17/080,698, filed Oct. 26, 2020, entitled "Efficient Compilation of Graph Queries on Top of SQL Based Relational Engine," and U.S. patent application Ser. No. 17/080,719, filed Oct. 26, 2020, entitled "Efficient Compilation of Graph Queries Involving Long Graph Query Patterns on Top of SQL Based Relational Engine," wherein the entire contents of which are hereby incorporated by reference as if fully set forth herein.

FIELD OF THE INVENTION

The present disclosure relates to techniques for compiling graph queries. More specifically, the disclosure relates to efficient compilation of graph queries on top of SQL based relational engine.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph processing is an important tool for data analytics. Relational database management systems (RDBMSs) increasingly allow their users to define property graph from relational tables and to query them using graph pattern matching queries. Most products limit users to define a graph out of a single vertex table and edge table (e.g., Microsoft SQL Server, SAP Hana). These graphs are called homogeneous graphs. The most advanced systems may define a graph out of multiple vertex and edge tables. For example, a heterogeneous graph may be created out of the existing tables in a database by mapping every dimension table to a vertex table and every fact table to an edge table. The only constraint is that vertex tables should have a primary key column and the edge tables should associate foreign keys corresponding to the primary keys into two different/same vertex tables.

Graph querying and pattern matching enables interactive exploration of graphs, similar to how SQL interacts with databases. Pattern matching refers to finding patterns in the graph that are homomorphic to a target pattern, such as a triangle. In addition to the structural pattern, the user can add projections, filters, etc., similar to SQL. Graph queries refer to "graph querying and pattern matching." Paths described by a path pattern can be fixed length patterns (e.g., those that have all the same lengths, variable length patterns (e.g., patterns that have varying length within known bounds, such between 2 and 4 hops), and recursive patterns (e.g., patterns that have unknown lengths).

Fixed length graph querying refers to graph queries whose pattern has a fixed length (they are neither variable nor recursive patterns). Industry solutions for supporting fixed length graph querying fall into one of the following categories: external specialized graph systems, external automatic translators, and manual query translation.

With external specialized graph systems, data is exported from a RDBMS into an external engine that implements specialized graph traversal operators. However, external specialized graph systems pose a high security concern as the data is exposed to a potential non-trustworthy external system. In addition, costs associated with implementation, deployment, and data exportation are high.

With external automatic translators, a graph query is translated into SQL and then sent for execution in a RDBMS. Since the translation happens without taking in account the inherent graph schema of the data, performance of the resulting SQL query is poor.

With manual query translations, a user manually translates a graph pattern query into SQL. Depending on the complexity of the graph pattern query, the equivalent SQL query can be huge and, thus, difficult to generate. This solution puts a huge burden on the user.

Discussed herein are approaches for supporting graph pattern matching queries inside a single machine RDBMS that supports SQL execution.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1A illustrates an example graph and an example target pattern.

FIG. 1B illustrates an example property graph.

FIG. 1C illustrates example tables associated with the graph of FIG. 1B.

DETAILED DESCRIPTION

Figure 2:
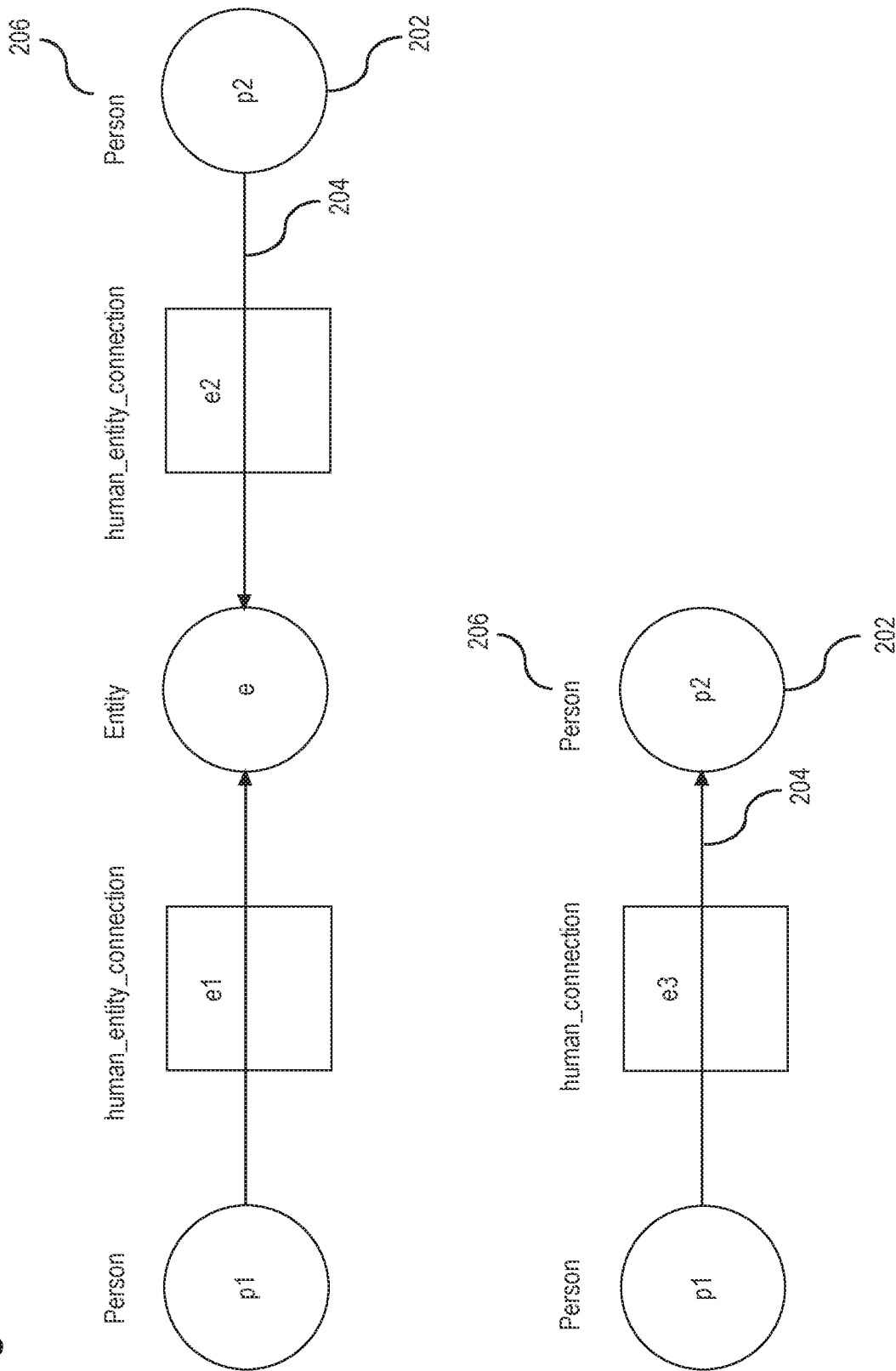
FIG. 2 illustrates an example intermediate representation of a graph pattern query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques described herein support graph pattern queries inside a RDBMS that supports SQL execution. The techniques efficiently compile a graph pattern matching query ("graph pattern query') into a relational SQL query that can then be efficiently executed by the relational engine. As a result, techniques enable efficient execution of graph pattern queries on top of the relational engine by avoiding any change in the existing SQL engine.

Background in Graph Processing Systems

A graph is a data structure used to model relationships between entities. A graph consists of a set of vertices (corresponding to entities) and a set of edges (corresponding to relationships). When data for a specific application has many relevant relationships, the data may be represented by a graph.

Graph processing systems can be split in two classes: graph analytics and graph querying. Graph analytics systems have a goal of extracting information hidden in the relationships between entities, by iteratively traversing relevant subgraphs or the entire graph. Graph querying systems have a different goal of extracting structural information from the data, by matching patterns on the graph topology.

Background in Graph Pattern Matching

Graph pattern matching refers to finding subgraphs, in a given directed graph, that are homomorphic to a target pattern. FIG. 1A illustrates an example graph and an example target pattern. If the target pattern is (a)→(b)→(c)→(a), then corresponding graph walks or paths of FIG. 1 are the following:

(1)→(2)→(3)→(1),
(2)→(3)→(1)→(2), and
(3)→(1)→(2)→(3).

One hop corresponds to a graph walk consisting of a single edge. A walk with n edges is considered as a n-hop pattern.

Translation from Relational Model to Property Graph Model

A property graph data model allows vertices and edges in a graph to have arbitrary properties as key-value pairs. FIG. 1B illustrates an example property graph. The property graph in FIG. 1B represents contact relationships between persons. The persons have name and age properties, while the relationships have a property indicting the age at which the subject knew the other person.

Conceptually, a RDBMS may be interpreted in a graph model. For example, all vertices and their properties may be grouped in a vertex table, while all relationships and their properties may be grouped in an edge table. As an example, the graph illustrated in FIG. 1B may be stored in a RDBMS as tables, as illustrated FIG. 1C. Each vertex has a unique identifier (i.e., $v_{id}$) in the vertex table (i.e., Persons table) where it is stored. Similarly, each edge has a unique identifier (i.e., $E_{id}$) in the edge table (i.e., Knows table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

High-Level Design

In an embodiment, graph pattern query processing is performed in a first phase and a second phase. The first phase includes a SQL/PGQ parser and a semantic analyzer. The SQL/PGQ parser identifies tokens from an input string (e.g., graph pattern query text) to construct an intermediate representation, which can be used by the second phase. The semantic analyzer generates a list of validated pattern specializations. The semantic analyzer may include a type checker configured to catch user errors at a graph query level. The second phase includes a SQL translator and uses a SQL compiler. The SQL translator generates a single or main SQL query (e.g., SQL UNION ALL text) from the specializations. The compiler builds row sources logically as an inlined view processing.

A graph pattern query is a query that specifies a pattern of connected vertices and edges to match within a graph. A graph pattern query may be a statement that conforms to a graph query language. Examples of a graph query language include PGQL, GQL, and Gremlin. PGQL is described in PGQL 1.3 Specification, 24 Mar. 2020, the contents of which are incorporated herein by reference. Gremlin is described in Apache TinkerPop, 3.4.8, TinkerPop Documentation. GQL is being developed by ISO/IEC JTC 1/SC 32 WG3.

Techniques described herein assume that graph data is stored in a set of relational tables inside the RDBMS and that there may be in-memory graph representation of the data. For purposes of discussion of these techniques, assume a user has defined a table schema as shown in Table 1.

TABLE 1

```
CREATE TABLE person (
  id NUMBER(5) PRIMARY KEY,
  name VARCHAR(100),
  age NUMBER(5), sal NUMBER(5)
);
CREATE TABLE company(
  id NUMBER(5) PRIMARY KEY,
  name VARCHAR(100),
  age NUMBER(5),
  size_c NUMBER(10)
);
CREATE TABLE place(
  id NUMBER(5) PRIMARY KEY, name VARCHAR(100),
  size_p NUMBER(10)
);
CREATE TABLE knows (
  e_src NUMBER(5) NOT NULL,
  e_dst NUMBER(5) NOT NULL,
  since NUMBER(5),
  CONSTRAINT fk_src_knows FOREIGN KEY (e_src) REFERENCES person(id),
  CONSTRAINT fk_dst_knows FOREIGN KEY (e_dst) REFERENCES person(id)
```

TABLE 1-continued

```
);
CREATE TABLE likes (
  e_src NUMBER(5) NOT NULL,
  e_dst NUMBER(5) NOT NULL,
  since NUMBER(5),
    CONSTRAINT fk_src_likes FOREIGN KEY (e_src) REFERENCES person(id),
    CONSTRAINT fk_dst_likes FOREIGN KEY (e_dst) REFERENCES person(id)
);
CREATE TABLE works_at (
  e_src NUMBER(5) NOT NULL,
  e_dst NUMBER(5) NOT NULL,
  since NUMBER(5),
    CONSTRAINT fk_src_works_at FOREIGN KEY (e_src) REFERENCES
person(id),
    CONSTRAINT fk_dst_works_at FOREIGN KEY (e_dst) REFERENCES
company(id)
);
CREATE TABLE located_in (
  e_src NUMBER(5) NOT NULL,
  e_dst NUMBER(5) NOT NULL,
  since NUMBER(5),
    CONSTRAINT fk_src_located_in FOREIGN KEY (e_src) REFERENCES
company(id),
    CONSTRAINT fk_dst_located_in FOREIGN KEY (e_dst) REFERENCES
place(id)
);
CREATE TABLE adores (
  e_src NUMBER(5) NOT NULL,
  e_dst NUMBER(5) NOT NULL,
    CONSTRAINT fk_src_adores FOREIGN KEY (e_src) REFERENCES
person(id),
    CONSTRAINT fk_dst_adores FOREIGN KEY (e_dst) REFERENCES place(id)
);
```

On top of these tables shown in Table 1, the user may define a native graph view. This may be achieved via execution of a DDL statement on top of the relational tables. Table 2 shows an example DDL statement to create a graph from the relational tables. The graph is stored in a property graph model or schema.

TABLE 2

```
CREATE PROPERTY GRAPH MY_GRAPH
VERTEX TABLES (
  person KEY (ID)
    LABEL person PROPERTIES(name, age, sal),
  company KEY (ID)
    LABEL company PROPERTIES(name, size_c)
    LABEL entity PROPERTIES(name),
  place KEY (ID)
    LABEL place PROPERTIES(name, size_p)
    LABEL entity PROPERTIES(name)
)
EDGE TABLES (
  knows KEY (E_SRC, E_DST)
    SOURCE KEY(E_SRC) REFERENCES person (ID)
    DESTINATION KEY(E_DST) REFERENCES person (ID)
    LABEL knows PROPERTIES(since AS years)
    LABEL human_connection PROPERTIES(since),
  likes KEY (E_SRC, E_DST)
    SOURCE KEY(E_SRC) REFERENCES person (ID)
    DESTINATION KEY(E_DST) REFERENCES person (ID)
    LABEL likes PROPERTIES(since)
    LABEL human_connection PROPERTIES(since),
  works_at KEY (E_SRC, E_DST)
    SOURCE KEY(E_SRC) REFERENCES person (ID)
    DESTINATION KEY(E_DST) REFERENCES company (ID)
    LABEL works_at PROPERTIES(since)
    LABEL human_entity_connection NO PROPERTIES,
  located_in KEY (E_SRC, E_DST)
    SOURCE KEY(E_SRC) REFERENCES company (ID)
    DESTINATION KEY(E_DST) REFERENCES place(ID)
    LABEL located_in PROPERTIES(since),
  adores KEY (E_SRC, E_DST)
    SOURCE KEY(E_SRC) REFERENCES person (ID)
```

TABLE 2-continued

```
    DESTINATION KEY(E_DST) REFERENCES place (ID)
    LABEL adores NO PROPERTIES
    LABEL human_entity_connection NO PROPERTIES
);
```

The DDL statement, shown in Table 2, classifies data tables into vertex tables and edge tables. Every vertex and edge table exposes a set of columns (called properties) which are grouped into a label. A label can be shared by multiple vertex/edge tables. For example, the label human_entity_connection is shared by the works_at edge table and the adores edge table. For another example, the label human_connection is shared by the knows edge table and the likes edge table. However, the label person is only used by the person vertex table.

A key of a vertex table identifies a unique vertex in the graph. The one or more columns to use as a key can be specified in the DDL statement; the one or more columns specified need not be defined as a primary vertex table. If no vertex table column is specified as a key, then the default key is the primary key of the vertex table. A key of an edge table unique identifies an edge in the KEY clause when specifying source and destination vertices uniquely identifies the source and destination vertices. A key of an edge table can be defined in similar manner as for a vertex table.

The DDL statement allows the user to define the graph as a first class citizen inside the database, which enables a compilation mechanism of graph pattern queries to use graph specific optimizations.

Continuing with the hypothetical, assume that the user wants to run the following graph pattern query shown in Table 3.

TABLE 3

```
-- Find all persons, which are connected, and that have at least one
entity in common.
SELECT * FROM GRAPH_TABLE (MY_GRAPH,
    MATCH
        (p1 is person)-[e1 is human_entity_connection]->(e is entity)<-
[e2 is human_entity_connection]-(p2 is person),
        (p1 is person)-[e3 is human_connection]->(p2 is person)
    WHERE p1.age + 3 < p2.age
    COLUMNS (p1.name as p1_name, p2.name as p2 name, p1.sal + p2.sal
as total_sal)
) T;
```

Using the techniques described herein, the SQL/PGQ parser, the semantic analyzer, and the SQL translator convert an input graph pattern query and output a single or main SQL query that can be executed on top of a RDBMS supporting SQL execution. Table 4 shows an example main SQL query converted from the graph pattern query shown in Table 3.

TABLE 4

```
(SELECT
    P1.name AS P1_NAME,
    P2.name AS P2_NAME,
    P1.sal + P2.sal AS TOTAL_SAL
FROM
    person P1,
    adores E1,
    place E,
    adores E2,
    person P2,
    likes E3
WHERE ( P1.id = E1.e_src
    AND E.id = E1.e_dst
    AND P2.id = E2.e_src
    AND E.id = E2.e_dst
    AND P1.id = E3.e_src
    AND P2.id = E3.e_dst )
    AND P1.age + 3 < P2.age)
UNION ALL
(SELECT P1.name AS P1_NAME,
    P2.name AS P2_NAME,
    P1.sal + P2.sal AS TOTAL_SAL
FROM
    person P1,
    works_at E1,
    company E,
    works_at E2,
    person P2,
    likes E3
WHERE ( P1.id = E1.e_src
    AND E.id = E1.e_dst
    AND P2.id = E2.e_src
    AND E.id = E2.e_dst
    AND P1.id = E3.e_src
    AND P2.id = E3.e_dst )
    AND P1.age + 3 < P2.age)
UNION ALL
(SELECT P1.name AS P1_NAME,
    P2.name AS P2_NAME,
    P1.sal + P2.sal AS TOTAL_SAL
FROM
    person P1,
    adores E1,
    place E,
    adores E2,
    person P2,
    knows E3
WHERE ( P1.id = E1.e_src
    AND E.id = E1.e_dst
    AND P2.id = E2.e_src
    AND E.id = E2.e_dst
    AND P1.id = E3.e_src
    AND P2.id = E3.e_dst )
    AND P1.age + 3 < P2.age)
```

TABLE 4-continued

```
UNION ALL
(SELECT P1.name AS P1_NAME,
    P2.name AS P2_NAME,
    P1.sal + P2.sal AS TOTAL_SAL
FROM
    person P1,
    works_at E1,
    company E,
    works_at E2,
    person P2,
    knows E3
WHERE ( P1.id = E1.e_src
    AND E.id = E1.e_dst
    AND P2.id = E2.e_src
    AND E.id = E2.e_dst
    AND P1.id = E3.e_src
    AND P2.id = E3.e_dst )
    AND P1.age + 3 < P2.age)
)
```

The SQL/PGQ parser, the semantic analyzer, and the SQL translator are each discussed below.

SQL/PGQ Parser

An input to the SQL/PGQ parser is an original graph pattern query, such as the graph pattern query text input shown in Table 3. The parser uses the language grammar to identify tokens in the input string and constructs an intermediate representation that is used in subsequent steps or phases.

An intermediate representation is a collection of one or more trees, representing a path pattern of the graph pattern query, with label constraints for all graph pattern variables in the original query text.

FIG. 2 illustrates an intermediate representation 200 of the graph pattern query text input shown in Table 3. The path pattern in this example is:

(p1 is person)-[e1 is human_entity_connection]→(e is entity)←[e2 is human_entity_connection]-(p2 is person), (p1 is person)-[e3 is human_connection]→(p2 is person)

Each graph pattern variable (e.g., p1, e1, e, e2, p2, e3) is represented as a node 202 or a link 204 in the intermediate representation. In an embodiment, each graph pattern variable associated with a vertex table (e.g., p1) is represented as a node 202, and each graph pattern variable associated with an edge table (e.g., e1) is represented as a link 204.

Each of the nodes 202 and links 204 has a label constraint 206 from the original graph pattern query text. For example, the node "p1" has the label person constraint from the original query text, and the link "e1" has a label human_entity_connection constraint from the original query text.

Semantic Analyzer

Since the graph pattern query is based on the property graph model, the graph pattern variables are bound to labels and not to actual data tables. In an embodiment, the semantic analyzer computes a set of valid assignments between every graph pattern variable and an underlying data table. Table 5 shows example assignments of variables to tables.

TABLE 5

| Variable -> Table name |
| --- |
| p1 -> person |
| e1 -> works_at |
| e -> company |
| e2 -> works_at |
| p2 -> person |
| e3 -> likes |

A valid assignment of all path variables to data tables is called a pattern specialization. A set of valid assignments is called a list of pattern specializations.

In an embodiment, prior to generating pattern specializations, all labels in the graph pattern query may be validated against the graph metadata of the DDL statement to validate that they are valid vertex/edge labels.

Pattern specializations are generated by first generating a mapping between every variable and its label by referencing the graph metadata. Table 6 shows example mapping of variables and corresponding labels.

TABLE 6

| Variable -> Label name |
| --- |
| p1 -> person |
| e1 -> human_entity_connection |
| e -> entity |
| e2 -> human_entity_connection |
| p2 -> person |
| e3 -> human_connection |

In an embodiment, once a valid set of labels is generated for every variable, a type-checking phase to type check expressions may start. The type-checking phase is described in the Type Checking section below.

Every label is then resolved to the set of data tables on top of which it is defined. A variable can be bound to multiple labels or label expressions. In this case, all the tables spanned by those labels or by the label expression are resolved. This information is fetched from the graph metadata. Table 7 shows example mapping of variables and corresponding sets of tables.

TABLE 7

| Variable -> Set of table names |
| --- |
| p1 -> {person} |
| e1 -> {works_at, adores} |
| e -> {place, company} |
| e2 -> {works_at, adores} |
| p2 -> {person} |
| e3 -> {knows, likes} |

For every variable in the previous mapping shown in Table 7, a table name is picked to generate a new mapping (called specialization) where every variable is bound to a single table name. The mapping is then validated against the graph metadata. The validation includes pruning specializations which are corresponding to non-existing connections in the graph. Table 8 shows example specializations. Each of the example specializations is either valid or invalid.

TABLE 8

| |
| --- |
| // Valid specialization |
| Variable -> Table name |
| ---------------------- |
| p1 -> person |
| e1 -> works_at |
| e -> company |
| e2 -> works_at |
| p2 -> person |
| e3 -> likes |
| // Invalid specialization |
| Variable -> Table name |
| ---------------------- |
| p1 -> person |
| e1 -> works_at |
| e -> place   // a person cannot be connected to a place via a "works_at" edge table; so, this specialization is dropped. |
| e2 -> works_at |
| p2 -> person |
| e3 -> likes |

The second validation shown in Table 8 is invalid because a person cannot be connected to a place via a works_at edge table, based on the DDL statement. Rather, a person can only be connected to a company via a works_at edge table.

In an embodiment, pruning invalid specializations is done at compilation time, which avoids checking whether a connection exists during at runtime. As the generated or main SQL query is more compact, it will also help reduce its compilation time, providing a clear performance benefit compared to prior solutions that perform these kind of checks at runtime.

The result of the pattern specialization phase is a list of pattern specializations that have been validated against the graph metadata. Table 9 shows an example result of the pattern specialization phase.

TABLE 9

| |
| --- |
| // Specialization 1 |
| Variable -> Table name |
| ---------------------- |
| p1 -> person |
| e1 -> adores |
| e -> place |
| e2 -> adores |
| p2 -> person |
| e3 -> likes |
| // Specialization 2 |
| Variable -> Table name |
| ---------------------- |
| p1 -> person |
| e1 -> works_at |
| e -> company |
| e2 -> works_at |
| p2 -> person |
| e3 -> likes |
| // Specialization 3 |
| Variable -> Table name |
| ---------------------- |
| p1 -> person |
| e1 -> adores |
| e -> place |
| e2 -> adores |
| p2 -> person |
| e3 -> knows |
| // Specialization 4 |
| Variable -> Table name |
| ---------------------- |
| p1 -> person |
| e1 -> works_at |

TABLE 9-continued

```
e -> company
e2 -> works at
p2 -> person
e3 -> knows
```

The list of specializations is sent to the next phase, where a valid SQL query that acts only on existing connections on the graph is generated.

SQL Translator

The SQL translator transforms each pattern specialization into an individual SQL query block. Once generated, individual SQL query blocks are union-ed via UNION ALL clause to generate a single or main SQL query.

In an embodiment, a pattern specialization is first transformed into a FROM clause. Table 10 shows an example transformation into a FROM clause for Specialization 1 from Table 9.

TABLE 10

```
// Specialization 1
Variable -> Table name
----------------------
  p1 -> person
  e1 -> adores
  e -> place
  e2 -> adores
  p2 -> person
  e3 -> likes
// FROM clause. Notice that variable names become table aliases
FROM
  person P1,
  adores E1,
  place E,
  adores E2,
  person P2,
  likes E3
```

Second, as shown in Table 11, a SELECT clause is generated from the COLUMNS clause of the original graph pattern query. Projected property names qualified with pattern variable (<var>.<property name>, e.g., p1.name) are replaced with column name qualified by the original table name (<table>.<column name>, e.g., P1.name).

TABLE 11

```
// COLUMNS clause in graph query
COLUMNS (p1.name as p1_name, p2.name as p2_name, p1.sal + p2.sal
as total_sal)
// transformed into SELECT clause in the SQL
SELECT
  P1.name AS P1_NAME,
  P2.name AS P2_NAME,
  P1.sal + P2.sal AS TOTAL_SAL
// Notice that in this example, property names ("name" and "sal") use
the same name as the actual column names of the table.
```

Third, as shown in Table 12, the WHERE clause is copied from the WHERE clause of the original graph pattern query. Property names in the graph pattern query are replaced with actual column names on the original data table.

TABLE 12

```
// WHERE clause in graph query
WHERE p1.age + 3 < p2.age
// transformed into WHERE clause in SQL:
```

TABLE 12-continued

```
WHERE P1.age + 3 < P2.age
// Notice that in this example, property names ("age") use the same
name as the actual column names.
```

Lastly, as shown in Table 13, the JOIN condition between the data tables is added and it is concatenated with the rest of the WHERE clause. The primary keys and foreign keys columns for each JOIN are looked up in the graph metadata that stores information.

TABLE 13

```
WHERE ( P1.id = E1.e_src
  AND E.id = E1.e_dst
  AND P2.id = E2.e_src
  AND E.id = E2.e_dst
  AND P1.id = E3.e_src
  AND P2.id = E3.e_dst ) // join condition added
  AND P1.age + 3 < P2.age // existing WHERE clause condition.
```

Table 14 shows an example individual SQL query block for Specialization 1. The example SQL query block includes the FROM clause, the SELECT clause, and the WHERE clause.

TABLE 14

```
SELECT
  P1.name AS P1_NAME,
  P2.name AS P2_NAME,
  P1.sal + P2.sal AS TOTAL_SAL
FROM
  person P1,
  adores E1,
  place E,
  adores E2,
  person P2,
  likes E3
WHERE ( P1.id = E1.e_src
  AND E.id = E1.e_dst
  AND P2.id = E2.e_src
  AND E.id = E2.e_dst
  AND P1.id = E3.e_src
  AND P2.id = E3.e_dst )
  AND P1.age + 3 < P2.age
```

These transformation steps described above are performed for each valid specialization, resulting in individual SQL query blocks for the valid specializations. All individual SQL query blocks are then UNION ALL into a single or main SQL query, which is shown in Table 4. The main SQL query is ready for execution on top of the SQL engine of the underlying RDBMS.

Complex Scenarios

In an embodiment, the compilation pipeline supports complex scenarios, such as anonymous variables and complex graph patterns including cycles and trees.

Anonymous Variables. Graph query patterns might omit names for some of the variables. These variables are called anonymous variables. Table 15 shows an example graph query pattern.

TABLE 15

```
SELECT * FROM GRAPH_TABLE (MY_GRAPH,
  MATCH
    (p1 is person)-[is human_entity_connection]->(e is entity)
  COLUMNS (p1.name as p1_name)
) T;
```

In the example graph query pattern shown in Table 15, the edge is an anonymous variable because it does not have a name. During parsing time, a unique variable name is generated for each anonymous variable. In this example, a unique name "e1" is generated for the anonymous edge variable, as shown in Table 16.

TABLE 16

SELECT * FROM GRAPH_TABLE (MY_GRAPH,
  MATCH
    (p1 is person)-[e1 is human_entity_connection]->(e is entity)
  COLUMNS (p1.name as p1_name)
) T;

The rest of the compilation resumes as described above.

Cycles and Trees. Graph query patterns may have cycles or might define more general graph patterns. Table 17 shows an example cycle path pattern and an example tree path pattern.

TABLE 17

// Cycle (triangle)
MATCH (a) -> (b) -> (c) -> (a)
// Tree
MATCH (a) -> (b), (a)-> (c)

A complex path pattern may involve a variable with same name that appears multiple times in the path pattern. In this case, at pattern specialization phase, the multiple occurrences of the same variable are bound to the same table name. The rest of the pattern specialization algorithm will then validate that the actual data tables can be connected in the same shape as the one specified in the path pattern.

Example SQL Query Generation Process

Figure 3:
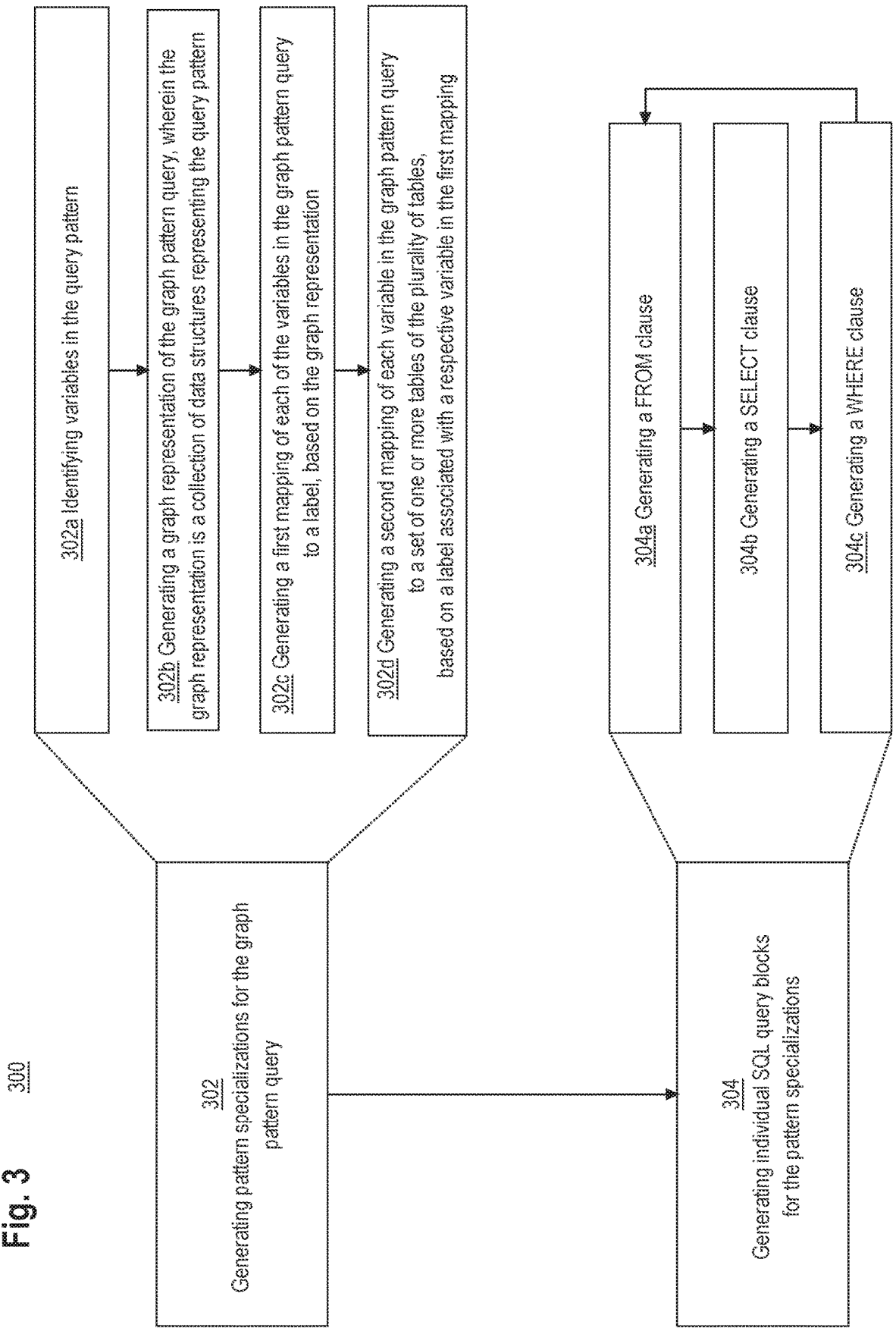
FIG. 3 illustrates an example flow diagram that depicts a process of generating a SQL query from a graph pattern query.

FIG. 3 illustrates an example flow diagram that depicts a process 300 of generating a main SQL query from a graph pattern query that includes a query pattern. The graph pattern query is issued against a heterogeneous graph having either vertices or edges stored in a plurality of tables. An example graph pattern query is shown in Table 3. At least two tables of the plurality of tables each store either vertices of the graph or edges of the graph. The graph is defined by a database dictionary of a relational database system. An example graph definition is shown in Table 2.

At block 302, pattern generalizations for the graph pattern query are generated. Each of the pattern specializations is a mapping of each variable in the query pattern to a respective table of the plurality of tables. Examples of pattern generalizations are shown in Table 9.

In an embodiment, the pattern generalizations for the graph pattern query may be generated by steps described in blocks 302a-302d.

At block 302a, variables in the query pattern are identified. In some scenarios, the query pattern may include at least one anonymous variable in the query pattern. In such a scenario, a unique variable name is generated for each anonymous variable in the query pattern.

At block 302b, a graph representation of the graph pattern query is generated. The graph representation is a collection of data structures representing the query pattern. The graph representation includes nodes and links representing the variables. Each of the nodes and links is associated with a label constraint from the graph pattern query. An example graph representation is illustrated in FIG. 2.

At block 302c, a first mapping of each of the variables in the graph pattern query to a label is generated, based on the graph representation. An example first mapping is shown in Table 6.

At block 302d, a second mapping of each variable in the graph pattern query to a set of one or more tables of the plurality of tables is generated, based on a label associated with a respective variable in the first mapping. An example second mapping is shown in Table 7.

In an embodiment, each of the pattern specializations is generated based on the second mapping and a definition of the graph. In some scenarios, the query pattern may include a variable that occurs multiple times in the query pattern. In such a scenario, for each of the pattern specializations, the same table from the plurality of tables is used for each occurrence of the variable in the query pattern.

After the pattern generalizations for the graph pattern query are generated, at block 304, individual SQL query blocks for the pattern specializations are generated. An example individual SQL query block is shown in Table 13.

In an embodiment, the individual SQL query blocks for the pattern specializations may be generated according to steps described in blocks 304a-304d for each of the pattern specializations. The steps described in blocks 304a-304d may be performed in a different order and/or in parallel; one or more steps described in blocks 304a-304d may be optional.

A block 304a, a FROM clause is generated. The FROM clause includes a table alias for each variable in a respective pattern specialization. An example FROM clause is shown in Table 10.

At block 304b, a SELECT clause is generated. The SELECT clause includes a first column name corresponding with each projected property name that is qualified with a variable in a COLUMN clause of the graph pattern query. The first column name is qualified by a table alias of a first particular table of the plurality of tables. An example SELECT clause is shown in Table 11.

At block 304c, a WHERE clause is generated. The WHERE clause includes a second column name corresponding with each property name that is qualified with a variable in an WHERE clause of the graph pattern query. The second column name is qualified by a table alias of a second particular table of the plurality of tables. The WHERE clause further includes a JOIN condition between particular tables of the plurality of tables associated with the respective pattern specializations. An example WHERE clause is shown in Table 13.

In an embodiment, an individual SQL query block corresponding to the respective pattern specialization includes the FROM clause, the COLUMN clause, and/or the WHERE clause generated at blocks 304a-304d.

In an embodiment, the main SQL query includes a UNION ALL condition between the individual SQL query blocks. The main SQL query is executable by a relational database system to generate a result for the graph pattern query. An example main SQL query is shown in Table 4.

Vertex and Edge Identifiers

In an embodiment, the compilation pipeline supports user-defined vertex and edge identifiers. Users may want to have a unique way to identify their vertices/edges. These vertices/edges are uniquely identified such that they can then be used in the rest of the SQL query. Table 18 shows an example graph query pattern.

TABLE 18

```
SELECT id_p1 <> id_p2 FROM GRAPH_TABLE (MY_GRAPH, // use vertex/edge
ids in the rest of the SQL query
    MATCH
        (p1 is person)-[c is human_entity_connection]->(p2 is entity)
    COLUMNS (vertex_id(p1) as id_p1, edge_id(c) as id_c, vertex_id(p2)
as id_p2) // uniquely identify vertex/edge
) T
ORDER BY id_c; // use vertex/edge ids in the rest of the SQL query
```

Since each vertex/edge table may have a different set of primary key columns to be used as a vertex id or an edge id, a construct is needed to express a global graph vertex/edge id (called vertex_id and edge_id in the example shown in Table 18), which is logically a union of primary key columns from each individual vertex or edge table. Furthermore, each global graph id must be comparable for equality to support distinct and group by operations of global graph ids.

In an embodiment, a RDBMS is configured to recognize and compute a vertex_id and edge_id as native operators referenced in statements, similar to other functions and operators such a MAX, SUM, LTRIM, row_id, and CONCAT. In an embodiment, a JSON datatype is used to support a graph global id by leveraging native JSON datatype support from RDBMS. A set of primary key columns used for a local vertex/edge id is grouped as a JSON object. This is augmented with graph and graph element table name (which is unique within the graph, as opposed to the fully qualified name of the schema object which may be used for different vertex/edge table within the graph).

For example, a table with id 123 having primary key columns (firstName, lastName, schoolid) with value ('Mary', 'Sutton', 789456) is converted into a JSON object {"tableId": "123", "firstName": "Mary", "lastName": "Sutton", "schoolid": 789456}, which is internally stored as efficient binary format.

To support group by, distinct and equality operation of such JSON object datatype, an internal SQL operator GET_ID_CMP_BYTES(json_type) is used to return a SQL raw datatype.

The operator constructs a binary image of three sections. The first section is an integer table hash value generated by applying a hash function to the table id optionally followed by the table name. The table id may be used to resolve hash collisions. The table hash values of vertex ids may be used to more efficiently determine whether ids are matching by comparing respective table hash values to quickly rule out that the vertex ids are not of vertices from the same table. This same measure applies to edge ids. The second section is concatenation of all the JSON field names (and their lengths) from the JSON object type. The third section is concatenation of all the binary scalar values for the corresponding JSON fields (with their lengths).

Since the binary scalar values are memcomparable (byte-comparable), the binary result of GET_ID_CMP_BYTES (json_type) is memcomparable. This memcomparable property is leveraged to do group by, distinct, equality, order by, etc. The underlying SQL engine leverages memcomparable projection of expressions to handle the expression comparison to support SQL group by, distinct, order by and join.

Thus, the data type of a value returned for vertex_id or edge_id depends on context in which these operators are invoked within an SQL statement. If referenced in an order by clause without specifying a JSON field, for example, the binary result generated by GET_ID_CMP_BYTES is returned. If dot notation is used to reference a JSON field of vertex_id (e.g. vertex_id.lastName), then the vertex_id is treated as JSON object and the value of the field is returned.

Furthermore, to support a set of global ids, a JSON_ARRAY( ) is constructed to group all the input JSON objects for the ids and return a new JSON datatype instance. In addition, a graph pattern query may specify an aggregate function to aggregate JSON objects in a plurality of arrays. Table 19 shows an example graph query pattern.

TABLE 19

```
SELECT ARRAY_AGG(JSON_ARRAY(id_b))
FROM GRAPH_TABLE (g,
    MATCH (a) -> (b)
    COLUMNS (VERTEX_ID(a) as id_a, VERTEX_ID(b) as id_b)
)
GROUP BY id_a
```

The example graph query pattern shown in Table 19 includes the aggregate function ARRAY_AGG( ) in the SELECT clause. Execution of the graph pattern query generates a plurality of arrays to return as a result of the aggregate function. Each array of the plurality of arrays corresponds to a particular group of the plurality of groups. Specifically, the execution of the graph pattern query generates rows that each correspond to a path matching the MATCH clause. The rows include columns id_a and id_b, which hold vertex ids of a and vertex ids of b, respectively, of the matching paths. For each group, the respective array generated includes an element for each row in the group and holds the value for column id_b.

Example Process of Using Global Graph Identifiers

Figure 4:
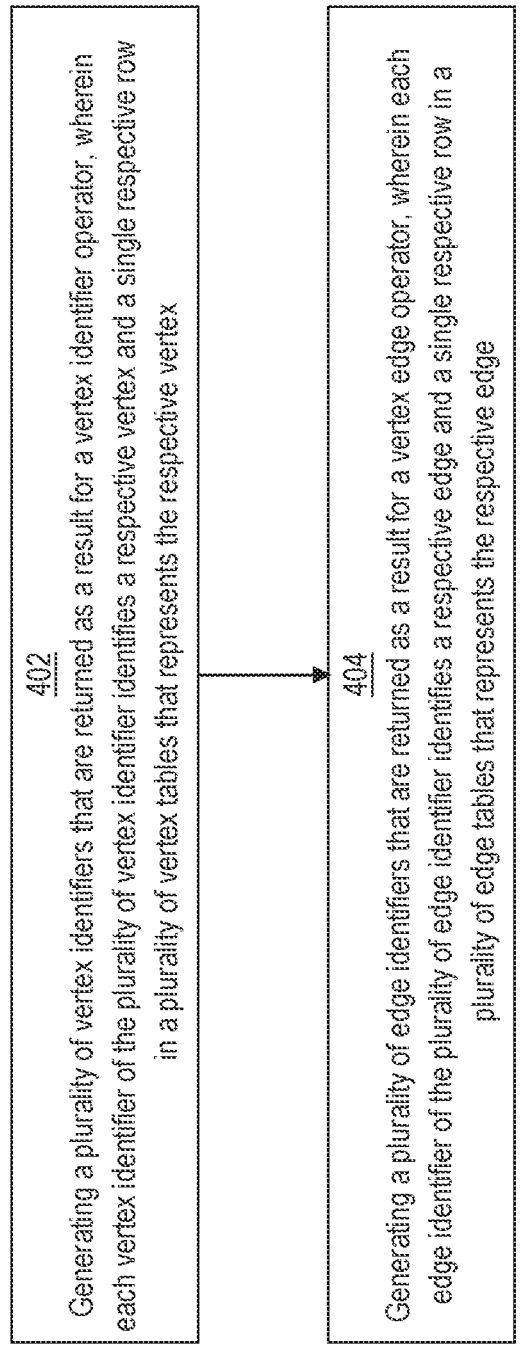
FIG. 4 illustrates an example flow diagram that depicts a process of using global graph identifiers during execution of a graph pattern query.

FIG. 4 illustrates an example flow diagram that depicts a process 400 of using global graph identifiers during execution of a graph pattern query. The graph pattern query is executed against a heterogenous graph having a plurality of vertices and a plurality of edges stored in a plurality of tables. The plurality of tables includes a plurality of vertex tables that store rows representing the vertices and a plurality of edge tables that store rows representing the edges. The graph pattern query includes a vertex identifier operator (e.g., vertex_id) referencing vertices of the graph. The graph pattern query may also include an edge identifier operator (e.g., edge_id) referencing edges of the graph. Each of the vertex and edge identifier operators is typed for as conforming to hierarchical markup language. An example hierarchical markup language is JSON. An example graph pattern query is shown in Table 18.

At block 402, a plurality of vertex identifiers is generated and returned as a result for the vertex identifier operator. Each vertex identifier of the plurality of vertex identifier identifies a respective vertex and a single respective row in the plurality of vertex tables that represents the respective vertex. The plurality of vertex identifiers includes a first vertex identifier that identifies a first vertex and a first row in a first vertex table of the plurality of vertex tables. The first row in the first vertex table represents the first vertex. The plurality of vertex identifiers also includes a second vertex identifier that identifies a second vertex and a second row in a second vertex table of the plurality of vertex tables. The second row in the second vertex table represents the second vertex.

In an embodiment, the first vertex identifier specifies the first vertex table and one or more primary key values stored in the first row in the first vertex table, and the second vertex identifier specifies the second vertex table and one or more primary key values stored in the second row in the second vertex table. Each of the first and second vertex identifiers includes a hierarchical object.

At block 404, a plurality of edge identifiers is generated and returned as a result for the edge identifier operator. Each edge identifier of the plurality of edge identifier identifies a respective edge and a single respective row in the plurality of edge tables that represents the respective edge. The plurality of edge identifiers includes a first edge identifier that identifies a first edge and a first row in a first edge table of the plurality of edge tables. The first row in the first edge table represents the first edge. The plurality of edge identifiers also includes a second edge identifier that identifies a second edge and a second row in a second edge table of the plurality of edge tables. The second row in the second edge table represents the second edge.

In an embodiment, the first edge identifier specifies the first edge table and one or more primary key values stored in the first row in the first edge table, and the second edge identifier specifies the second edge table and one or more primary key values stored in the second row in the second edge table. Each of the first and second edge identifiers includes a hierarchical object.

In an embodiment, the graph pattern query specifies to group by the vertex identifier operator. When the graph pattern query is executed, first vertices are grouped into a plurality of groups according to the vertex identifier operator by comparing table hash values of the plurality of vertex identifiers.

In an embodiment, the graph pattern query specifies an aggregate function. When the graph pattern query is executed, a plurality of arrays is generated to return as a result of the aggregate function. Each array of the plurality of arrays corresponds to a particular group of the plurality of groups and includes an array element for each vertex in the particular group.

Type Checking

In an embodiment, expressions may be type checked at the graph query level. One reason is early detection of type errors and easy display. Errors are generated before a generated SQL is type checked. By type checking at the graph query level, there is no need to map errors generated on the generated SQL in the original graph pattern query string.

Type expressions are checked at SQL/PGQ level. The type of a property is determined based on the label from where it comes. Table 20 shows an example graph schema and example queries based on the schema.

TABLE 20

```
-- Assume the following graph schema
CREATE PROPERTY GRAPH test_graph VERTEX TABLES (
vertex_1 KEY(V_ID) LABEL V_LABEL2 PROPERTIES(age , sal),
vertex_2 KEY(V_ID) LABEL V_LABEL1 PROPERTIES(v_id , age),
vertex_3 KEY(V_ID) LABEL V_LABEL2 PROPERTIES(age , sal),
vertex_4 KEY(V_ID) LABEL V_LABEL3 PROPERTIES(age)
)
-- Assume that:
---Property age in vertex label V_LABEL1 has type VARCHAR
---Property age in vertex label V_LABEL2 has type NUMBER
---Property age in vertex label V_LABEL3 has type BINARY DOUBLE
-- query is accepted. The type of age is VARCHAR
SELECT * FROM GRAPH_TABLE (test_graph ,
MATCH (a is V_LABEL1) COLUMNS (a.age))
-- query is accepted. The type of age is NUMBER
SELECT * FROM GRAPH_TABLE (test_graph ,
MATCH (a is V_LABEL2) COLUMNS (a.age))
-- query is accepted. The type of age is BINARY_DOUBLE
SELECT * FROM GRAPH_TABLE (test_graph ,
MATCH (a is V_LABEL3) COLUMNS (a.age))
-- error thrown at query compilation time
-- because there is no UNION compatible type for property age
-- across V_LABEL1 and V_LABEL2
SELECT * FROM GRAPH_TABLE (test_graph ,
MATCH (a is V_LABEL1 | V_LABEL2) COLUMNS (a.age))
-- error thrown at query compilation time
-- because there is no UNION compatible type for property age
-- across V_LABEL1 and V_LABEL2
SELECT * FROM GRAPH_TABLE (test_graph ,
MATCH (a is V_LABEL1 | V_LABEL2) WHERE a.age > 20 COLUMNS (1 as dummy
))
-- query is accepted. The type of age is BINARY_DOUBLE. Notice that
-- there is UNION compatible type between NUMBER and BINARY_DOUBLE
SELECT * FROM GRAPH_TABLE (test_graph ,
MATCH (a is V_LABEL2 | V_LABEL3) WHERE a.age > 20 COLUMNS (1 as dummy
))
``` identifier specifies the second edge table and one or more primary key values stored in the second row in the second The type-checking phase may be triggered in the semantic analysis phase, after the mapping between every variable and its label is generated. At this moment, every variable in the graph pattern query and a valid set of labels to which it can be bound are obtained or otherwise determined, as discussed above.

In an embodiment, for every expression in the graph pattern query,
obtain a SQL AST (abstract syntax tree);
for every property access (for example, "a.age") in this AST, find the type of the property based on the labels to which the variable is bound. For example, if variable "a" is bound to "V_LABEL2", then the type of age is NUMBER. For another example, if variable "a" is bound to "V_LABEL3", then the type of age is BINARY DOUBLE. The type of a property from a label is stored in the graph metadata such that a simple look up is able to retrieve the type. If a variable is bound to multiple labels, then multiple types are retrieved, and their UNION compatible type is determined. A UNION compatible type is a data type that is comparable with and subsumes the multiple types being compared. For example, VARCHAR and NUMBER are not comparable. However, NUMBER and BINARY DOUBLE are comparable; the UNION compatible type of NUMBER and BINARY DOUBLE is BINARY DOUBLE. Another example of a UNION compatible type is a JSON data type, which supports schema-flexible property graph usage. If no valid type can be found, then an error is thrown. Otherwise, the UNION compatible type is injected in the property access node.

A normal SQL type-checker is called on this AST.

The type of every property will be stored in the property access node. When generating the SQL, this type is used to add casts in order to enforce the type. Table 21 shows examples.

TABLE 21

-- EXAMPLE 1: Assume following query
MATCH (a is V_LABEL2 | V_LABEL3) WHERE a.age > 20 COLUMNS (1 as dummy
))
-- The type of a.age is BINARY_DOUBLE
-- A cast needs to be propagated at SQL generation for accesses which
are not having BINARY_DOUBLE type
SELECT 1 as dummy FROM vertex_1 a WHERE TO_BINARY_DOUBLE(a.age) > 20
UNION ALL
SELECT 1 as dummy FROM vertex_3 a WHERE TO_BINARY_DOUBLE(a.age) > 20
UNION ALL
SELECT 1 as dummy FROM vertex_4 a WHERE a.age > 20
-- EXAMPLE 2
-- Consider a graph as follows:
CREATE PROPERTY GRAPH
  VERTEX TABLES (
    VT1 LABEL L1 PROPERTIES( c1 * c2 as prop1, c8 as prop2, c9 as
prop3),   -- c1 and c2 are NUMBERS
    VT2 LABEL L1 PROPERTIES( cx as prop1, cy as prop2, cz as
prop3 ...)   -- cx is BINARY_DOUBLE
) ....;
-- And assume following query:
MATCH (v1 is L1)
  WHERE v1.prop1 > v1.prop2 / v1.prop3
-- SQL generated for the specialization of v1 to VT1 would
-- expand v1.prop to the expression c1 * c2, wrapped in a cast to
-- binary double (since the union type imposed here is binary double
-- because of vt2.prop)

Type-checking phase is done before pattern specializations are created such that the type of the expression change does not depend on the MATCH pattern. Table 22 shows an example.

TABLE 22

-- error thrown when type-checking is performed before pattern
-- specialization phase
-- because there is no UNION compatible type for property age
-- across V_LABEL1 and V_LABEL2
SELECT * FROM GRAPH_TABLE (test_graph ,
MATCH (a is V_LABEL1 | V_LABEL2)
WHERE a.age > 20 COLUMNS (1 as dummy ))
-- Assume now that type-checking is performed after
-- pattern specialization phase. For the following query, assume
-- that there is no connection between V_LABEL2 and V_LABEL4
MATCH (a is V_LABEL1 | V_LABEL2) -> (b is V_LABEL4)
WHERE a.age > 20 COLUMNS (1 as dummy ))
-- This means that after pattern specialization
-- a query which is equivalent to
-- MATCH (a is V_LABEL1) -> (b is V_LABEL4) is generated
WHERE a.age > 20 COLUMNS (1 as dummy ))
-- Now a.age > 20 type-checks without any issue
-- So, its type changed based on the path pattern.
-- This is the behavior to avoid.

Example of Type Checking Expressions

Figure 5:
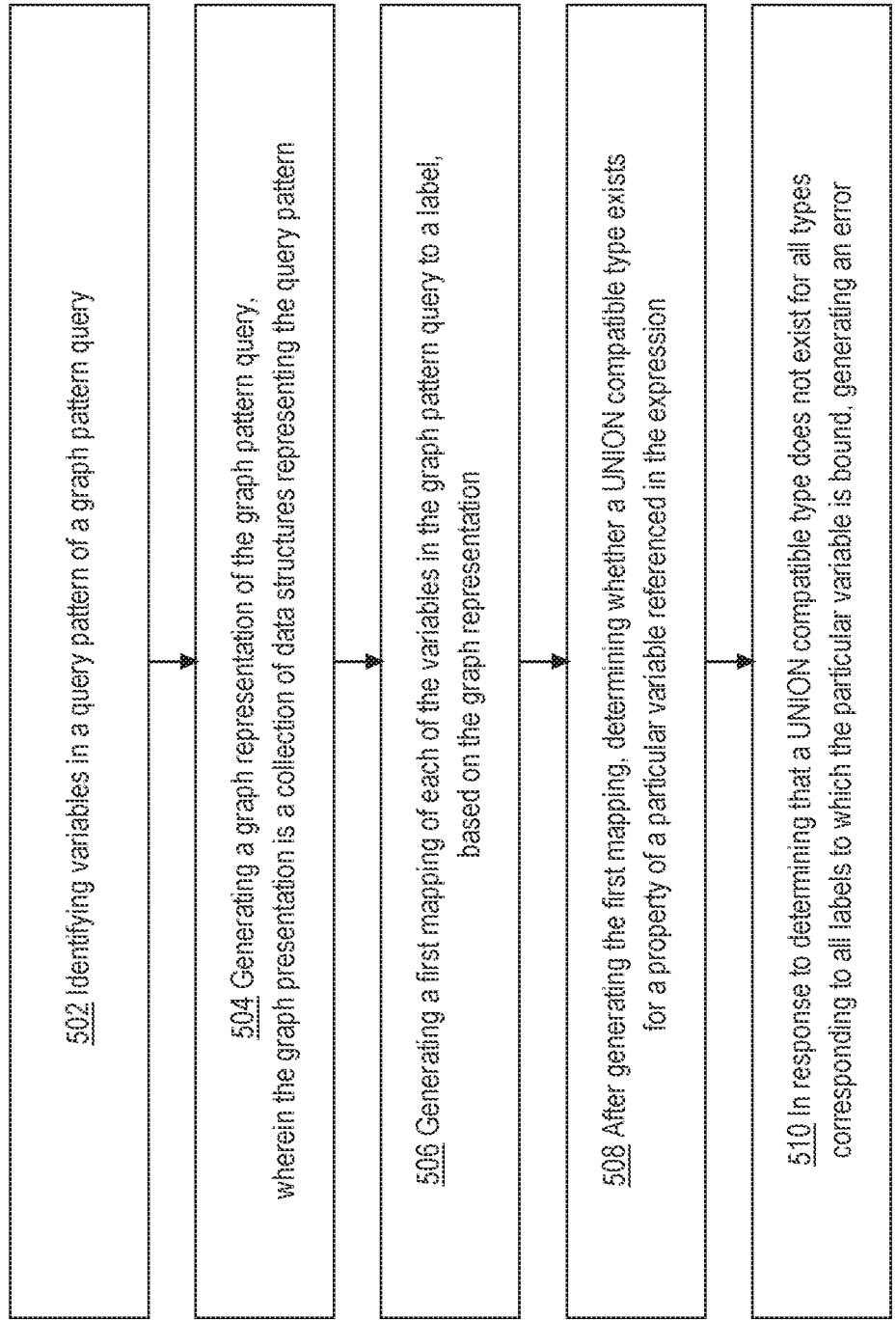
FIG. 5 illustrates an example flow diagram that depicts a process of type checking expressions during execution of a graph pattern query.

FIG. 5 illustrates an example flow diagram that depicts a process 500 of type checking expressions during execution of a graph pattern query. The graph pattern query is executed against a heterogenous graph having a plurality of vertices and a plurality of edges stored in a plurality of tables. At least two tables of the plurality of tables each store either vertices of the graph or edges of the graph. The graph pattern query includes a query pattern and an expression. Example graph pattern queries are shown in Table 20.

At block 502, variables in the query pattern are identified.

At block 504, a graph representation of the graph pattern query is generated. The graph representation is a collection of data structures representing the query pattern. The graph representation includes nodes and links representing the variables. Each of the nodes and links is associated with a label constraint from the graph pattern query. An example graph representation is illustrated in FIG. 2.

At block 506, based on the graph representation, a first mapping of each of the variables in the graph pattern query to a label is generated. An example first mapping is shown in Table 6.

At block 508, after the first mapping is generated, it is determined whether a UNION compatible type exists for a property of a particular variable referenced in the expression. In an embodiment, for each label to which the particular variable is bound, a type associated with the property based on the respective label is determined, according to a graph definition. After all types are retrieved, their UNION compatible type, if any, is determined.

At block 510, in response to determining that a UNION compatible type does not exist for all types corresponding to all labels to which the particular variable is bound, an error is generated.

Alternatively, in response to determining that a UNION compatible type does exist for the property of the particular variable, the UNION compatible type for all types corresponding to all labels to which the particular variable is bound is stored in property access node in an abstract syntax tree (AST) for the expression. An example UNION compatible type is a JSON data type for supporting schema-flexible property graph usage. The method then continues with steps to generate a main SQL query from the graph pattern query. For example, a second mapping of each variable in the graph pattern query to a set of one or more tables of the plurality of tables is then generated, based on a label associated with a respective variable in the first mapping. An example second mapping is shown in Table 7. Pattern specializations based on at least the second mapping are generated. Example specializations are shown in Table 9. Individual SQL query blocks for the pattern specializations are generated. An example individual SQL query block is shown in Table 13. The main SQL query includes a UNION ALL condition between the individual SQL query blocks. In an embodiment, the main SQL query may be generated from the second mapping and the AST. For example, the main SQL query comprises a type cast of the property of the particular variable according to a type indicated at the property access node in the AST. For another example, the main SQL query comprises a type cast of an expression expanded from the property of the particular variable according to a type indicated at the property access node in the AST. In an embodiment, a SQL type-checker may be performed on the AST.

Processing Expressions Over Vertex/Edge Properties

A graph DDL may allow definition of properties as expressions over vertex and edge properties. The expressions are defined over columns of the schema object used to define edge or vertex properties. The expression may use columns not exposed directly as property, e.g., PROPERTIES (age, sal, my_exp as age+bonus) in the example shown in Table 23.

TABLE 23

CREATE PROPERTY GRAPH test_graph
  VERTEX TABLES (
    vertex_1 KEY(V_ID) LABEL V_LABEL1 PROPERTIES(age , sal, my_exp as age + bonus))

This has the several benefits. First, the underlying optimizations in the RDBMS for processing expressions over columns can be directly leveraged. When generating the SQL text, any reference of "my_exp" is replaced with the actual expression "age+bonus". The SQL compiler will then be able to leverage any potential existing virtual column/optimization that applies to the "age+bonus" expression. In addition, support for UN-structured data types, such as JSON/XML, of the underlying RDBMS can be leveraged. For example, with the example DDL statement shown in Table 24, users can include in their graph properties defined over JSON/XML columns.

TABLE 24

CREATE PROPERTY GRAPH "myGraph"
  VERTEX TABLES (
    VT1 PROPERTIES(JSON_VALUE(JCOL, '$.person.creditscore[0]' returning number) AS CREDITSCORE),
    VT2 PROPERTIES(XMLCAST(XMLQUERY('/purchaseOrder/poDate' PASSING XCOL RETURNING CONTENT) AS DATE) AS PURCHASEDATE)
);

Dealing with Huge Number of Specializations

Long graph query patterns, with none or very loose label constraints, can trigger generation numerous feasible specializations. For example, assume the following graph query pattern MATCH (a)→(b)→(c)→(d)

and assume every vertex variable can be bound to 10 possible tables. Ignoring edge variables, this alone will generate 10,000 possible specializations. The high number of specializations will trigger the creation of the same number of UNION ALL queries. In the example, the main SQL query will contain 10,000 UNION ALL branches.

For the SQL engine and optimizer to obtain better performance in such a scenario, in an embodiment, a number of UNION ALL queries may be limited or optimized by splitting the graph query pattern into multiple simpler, shorter sub-patterns. Table 25 shows an example illustrating pattern splitting to help reduce the number of UNION ALL branches.

TABLE 25

Assume that after pattern specialization phase, a list of pattern specializations for the given pattern P(a,b,c,d) (MATCH (a)->(b)->(c)->(d)) is generated:
  S1 S2 S3 // specializations
  a -> VT1 VT1 VT2
  b -> VT2 VT2 VT2 // P(a,b,c,d) - pattern P over variables a,b,c,d
  c -> VT1 VT4 VT4
  d -> VT3 VT4 VT4
Here, there are 3 specializations: S1, S2, and S3.
This table may be split at some point, such at point b. After the split, two sub-patterns over different set of variables are generated. The first sub-pattern is P1(a,b) and the second sub-pattern is P2(b,c,d).
  a -> VT1 VT1 VT2 // P1(a,b)

TABLE 25-continued

```
b -> VT2 VT2 VT2
-------------------------------
b -> VT2 VT2 VT2
c -> VT1 VT4 VT4 // P2(b,c,d)
d -> VT3 VT4 VT4
The next step is to reduce the number of specializations in each of
the sub-patterns P1 and P2 by dropping from the specializations any
duplicated mappings. This will result in the following:
a -> VT1 VT2 // {a->VT1, b->VT2} was dropped
b -> VT2 VT2
-------------------------------
b -> VT2 VT2
c -> VT1 VT4 // {b->VT2, c->VT4, d->VT4} was dropped
d -> VT3 VT4
Now, there are only 2 specializations in each sub-pattern. So, UNION
ALL queries of size 2 (instead of 3 initially) are generated.
```

In an embodiment, a split may be performed at a particular variable in a graph query pattern at which a total number of specializations for a sub-pattern including that variable is a maximum number of specializations below a predetermined threshold. Table 26 shows an example pseudo code for performing such a split.

TABLE 26

```
let a = the first variable on path;
let b = the first variable on path;
i = 0;
find the no. of pattern instantiations between a and b (e.g., the
number of tables bound to the first variable);
while (b is not the last variable on path)
{
    let b_next = the next variable on path from b;
    let n = the no. of pattern instantiations from a to b_next;
    if (n > cut off for union all branches and a != b)
    {
        i++;
        save b as the i-th splitting variable;
        let a = b, b = b;
        find the no. of pattern instantiations between a and b;
    }
    else
        let b = b_next;
}
```

When a graph query pattern is split into sub-patterns, to thereafter form the main SQL query, a sub-pattern view (e.g., UNION ALL view) is generated for each of the sub-patterns, and the views are joined together. Table 27 shows an example graph pattern query to illustrate how a corresponding main SQL query is formed.

TABLE 27

```
SELECT * FROM GRAPH_TABLE (MY_GRAPH,
    MATCH
        (p1 is person)->(p2 is person)->(p3 is person)->(p4 is person)-
>(p5 is person)->(p6 is person)
        COLUMNS (p1.name as name1, p6.name as name2)
) T;
```

In the example shown in Table 27, since a PERSON vertex is connected to another PERSON vertex through either a KNOWS edge or a LIKES edge, there is a total of 32 valid pattern specializations for the pattern specified in the graph pattern query above. Instead of generating a UNION ALL query with 32 branches, the long graph query pattern may be split into 2 smaller patterns, a UNION ALL view may be generated for each of the sub-patterns, and UNION ALL views may be joined together. For example, the long pattern of (p1 is person)→(p2 is person)→(p3 is person)→(p4 is person)→(p5 is person)→(p6 is person) may be split at p4, for performance reasons, into a first part/sub-pattern of (p1 is person)→(p2 is person)→(p3 is person)→(p4 is person), and a second part/sub-pattern of (p4 is person)→(p5 is person)→(p6 is person).

As shown in Table 28, a UNION ALL view of the first part is constructed representing the first sub-pattern. The first part (e.g., part1) is a UNION ALL query of 8 branches as there are 8 valid pattern specializations for this first sub-pattern.

TABLE 28

```
(SELECT p1.name as name, 'PERSON' as end_table_name,
p4.id as end_id1
FROM person p1,
    likes e1,
    person p2,
    likes e2,
    person p3,
    likes e3,
    person p4
WHERE p1.id = e1.e_src
    AND e1.e_dst = p2.id
    AND p2.id = e2.e_src
    AND e2.e_dst = p3.id
    AND p3.id = e3.e_src
    AND e3.e_dst = p4.id
UNION ALL
SELECT p1.name as name, 'PERSON' as end_table_name,
p4.id as end_id1
FROM person p1,
    likes e1,
    person p2,
    likes e2,
    person p3,
    knows e3,
    person p4
WHERE p1.id = e1.e_src
    AND e1.e_dst = p2.id
    AND p2.id = e2.e_src
    AND e2.e_dst = p3.id
    AND p3.id = e3.e_src
    AND e3.e_dst = p4.id
UNION ALL
...
UNION ALL
SELECT p1.name as name, 'PERSON' as end_table_name,
p4.id as end_id1
FROM person p1,
    knows e1,
    person p2,
    knows e2,
    person p3,
    knows e3,
    person p4
WHERE p1.id = e1.e_src
    AND e1.e_dst = p2.id
    AND p2.id = e2.e_src
    AND e2.e_dst = p3.id
    AND p3.id = e3.e_src
    AND e3.e_dst = p4.id
) part1
```

The SELECT list of each of the UNION ALL branches has 3 items. The first SELECT item (e.g., p1.name) is included because column p1.name is referenced inside the COLUMNS clause of the graph pattern query shown in Table 27. The other two SELECT items, when combined, identifies the vertex row that is bound to variable p4 on the end of the sub-pattern. More specifically, the end_table_name column specifies which vertex table variable p4 is bound to, and the end_id1 column gives the key of the row from that vertex table.

Similarly, a UNION ALL view of the second part is constructed representing the second sub-pattern, as shown in Table 29. The second part (e.g., part2) is a UNION ALL view of 4 branches as there are 4 valid pattern specializations for the second sub-pattern.

TABLE 29

```
(SELECT 'PERSON' as start_table_name, p4.id as start_id1, p6.name
as name
FROM person p4,
  likes e4,
  person p5,
  likes e5,
  person p6
WHERE p4.id = e4.e_src
  AND e4.e_dst = p5.id
  AND p5.id = e5.e_src
  AND e5.e_dst = p6.id
UNION ALL
SELECT 'PERSON' as start_table_name, p4.id as start_id1, p6.name as
name FROM person p4,
  likes e4,
  person p5,
  likes e5,
  person p6
WHERE p4.id = e4.e_src
  AND e4.e_dst = p5.id
  AND p5.id = e5.e_src
  AND e5.e_dst = p6.id
UNION ALL
SELECT 'PERSON' as start_table_name, p4.id as start_id1, p6.name as
name FROM person p4,
  likes e4,
  person p5,
  likes e5,
  person p6
WHERE p4.id = e4.e_src
  AND e4.e_dst = p5.id
  AND p5.id = e5.e_src
  AND e5.e_dst = p6.id
UNION ALL
SELECT 'PERSON' as start_table_name, p4.id as start_id1, p6.name as
name FROM person p4,
  likes e4,
  person p5,
  likes e5,
  person p6
WHERE p4.id = e4.e_src
  AND e4.e_dst = p5.id
  AND p5.id = e5.e_src
  AND e5.e_dst = p6.id
) part2
```

The SELECT list of each of the UNION ALL branches has 3 item. The first two SELECT items (e.g., start_table_name and start_id1), when combined, identifies the vertex row that is bound to variable p4. The last SELECT item (e.g., p6.name) is included because column p6.name is referenced inside the COLUMNS clause of the graph pattern query shown in Table 27.

The result query is a join of the two UNION ALL views constructed for each of the sub-patterns. As the graph query pattern splits on variable p4, it implies that the row bound to the end vertex of the first sub-pattern and the row bound to the start vertex of the second sub-pattern are the same. This is be expressed in the join condition that the corresponding rows for the start vertex and end vertex are from the same table and have the same keys, as illustrated in Table 30.

TABLE 30

```
SELECT part1.name as name1, part2.name as name2
FROM (...) part1, (...) part2 // part1 and part2 are the UNION ALL
views for the two sub-patterns
WHERE part1.end_table_name = part2.start_table_name // <- start and
end vertexes are from the same table
AND part1.end_id1 = part2.start_id1 // <- start and end vertexes
have the same key
;
```

Thus, instead of a UNION ALL query of 32 branches, the result query is a join of two UNION ALL views, with 8 and 4 branches, respectively.

In the example above, the split variable p4 can be bound to table PERSON only. Moreover, the table has one key column only. However, a split variable may be bound to multiple tables, and some of the tables may a multi-column key. In the latter case, all the columns of the key for each vertex table need to be included in the SELECT list when forming the UNION ALL view. Table 31 shows an example query.

TABLE 31

```
// this is an example query for illustration purpose
SELECT * FROM GRAPH_TABLE (MY_GRAPH,
  MATCH
    (p1 is person)-(A)-(B)-(e is entity)-(C)-(D)-(p2 is person)
  WHERE p1.age + 3 < p2.age
  COLUMNS (p1.name as p1_name, p2.name as p2_name, p1.sal +
p2.sal as total_sal)
) T;
```

The graph query pattern specified in the query shown in Table 31 has a large number of valid pattern specializations and, thus, an equivalent UNION ALL query has an equally large number of branches.

Assume that this pattern is split into 2 sub-patterns on vertex variable e. Since variable e can be bound to either COMPANY table or PLACE table, keys from both tables are included in the SELECT clause when forming the SELECT list for each pattern specialization of sub-pattern (p1 is person)-(A)-(B)-(e is entity).

For a UNION ALL branch corresponding to a pattern specialization with variable e bound to COMPANY table, the SELECT clause is formed as follows:

```
SELECT p1.name as name, p1.sal as sal, p1.age as age, 'COMPANY'
as end_table_name, e.id as end_id1, null as end_id2
```

Similarly, for a pattern specialization with variable e bound to PLACE table, the SELECT clause is formed as follows:

```
SELECT p1.name as name, p1.sal as sal, p1.age as age, 'PLACE' as
end_table_name, null as end_id1, e.id as end_id2
```

Likewise, for the second sub-pattern (e is entity)-(C)-(D)-(p2 is person), for a pattern specialization with variable e bound to COMPANY table, the SELECT clause is formed as follows:

```
SELECT 'COMPANY' as start_table_name, e.id as start_id1, null as
start_id2, p2.sal as sal, p2.age as age
```

And, for a pattern specialization with variable e bound to PLACE table, the SELECT clause is formed as follows:

```
SELECT 'PLACE' as start_table_name, null as start_id1, e.id as
start_id2, p2.sal as sal, p2.age as age
```

The result query is a join of the two UNION ALL views for the two sub-patterns, as shown in Table 32.

TABLE 32

```
SELECT part1.name as p1_name, part2.name as p2_name, part1.sal +
part2.sal as total
FROM (...) part1, (...) part2
WHERE ((part1.end_table_name = part2.start_table_name AND
part1.end_table_name = 'COMPANY' AND      // both start vertex and end
vertex are from COMPANY
      part1.end_id1 = part2.start_id1)         // and both start vertex and
end vertex have same COMPANY key
   OR
      (part1.end_table_name = part2.start_table_name AND
part1.end_table_name = 'PLACE' AND        // both start vertex and end
vertex are from PLACE table
      part1.end_id2 = part2.start_id2))           // and both start vertex
and end vertex have same PLACE key AND (part1.age + 3 < part2.age)
;
```

The examples shown above illustrate how to generate a main SQL query when a pattern is split into two sub-patterns. If a pattern has a large number of valid pattern specializations, it may need to be split more than once so that for each sub-pattern, its number of valid pattern specializations does not exceed certain limit. In some scenarios, splitting on a vertex variable that is bound to one table only may be more desirable than otherwise.

Generating the equivalent SQL query is similar to the 2 sub-pattern example. That is, for each sub-pattern, a UNION ALL view is constructed representing all the valid pattern specializations, and the result query is the joins of the views from each sub-patterns with join conditions on each of the splitting nodes. Note that for a sub-pattern other than the first and the last, when generating UNION ALL view, the SELECT list needs to include all the keys of the tables bound to the start variable and all the keys of the tables bound to the end variable of the sub-pattern.

With the global graph vertex/edge id (referred to herein as vertex_id and edge_id), generating SQL query text when a pattern is split into multiple sub-patterns can be simplified. Referring to the example shown in Table 31, assume the graph query pattern is split into 2 sub-patterns on vertex variable e. Even though variable e can be bound to either table COMPANY or table PLACE, for each pattern specialization of the sub-pattern (p1 is person)-(A)-(B)-(e is entity), the SELECT clause of each UNION ALL branch is formed as follows regardless e is bound to COMPANY or PLACE.

SELECT p1.name as name, p1.sal as sal, p1.age as age,
   e.vertex_id as end_vertex_id Similarly, for the second sub-pattern (e is entity)-(C)-(D)-(p2 is person), the SELECT clause of each UNION ALL branch is formed as follows regardless e is bound to table COMPANY or PLACE.

SELECT e.vertex_id as start_vertex_id, p2.sal as sal,
   p2.age as age

The result query is a join of the two UNION ALL views with a simple JOIN condition on the global vertex_ids, as shown in Table 33.

TABLE 33

```
SELECT part1.name as p1_name, part2.name as p2_name, part1.sal +
part2.sal as total
FROM (...) part1, (...) part2
WHERE part1.end_vertex_id = part2.start_vertex_id // join condition:
the global vertex ids are the same on the split vertex
AND (part1.age + 3 < part2.age)
;
```

Example Process of Limiting a Number of Union all Query Blocks

Figure 6:
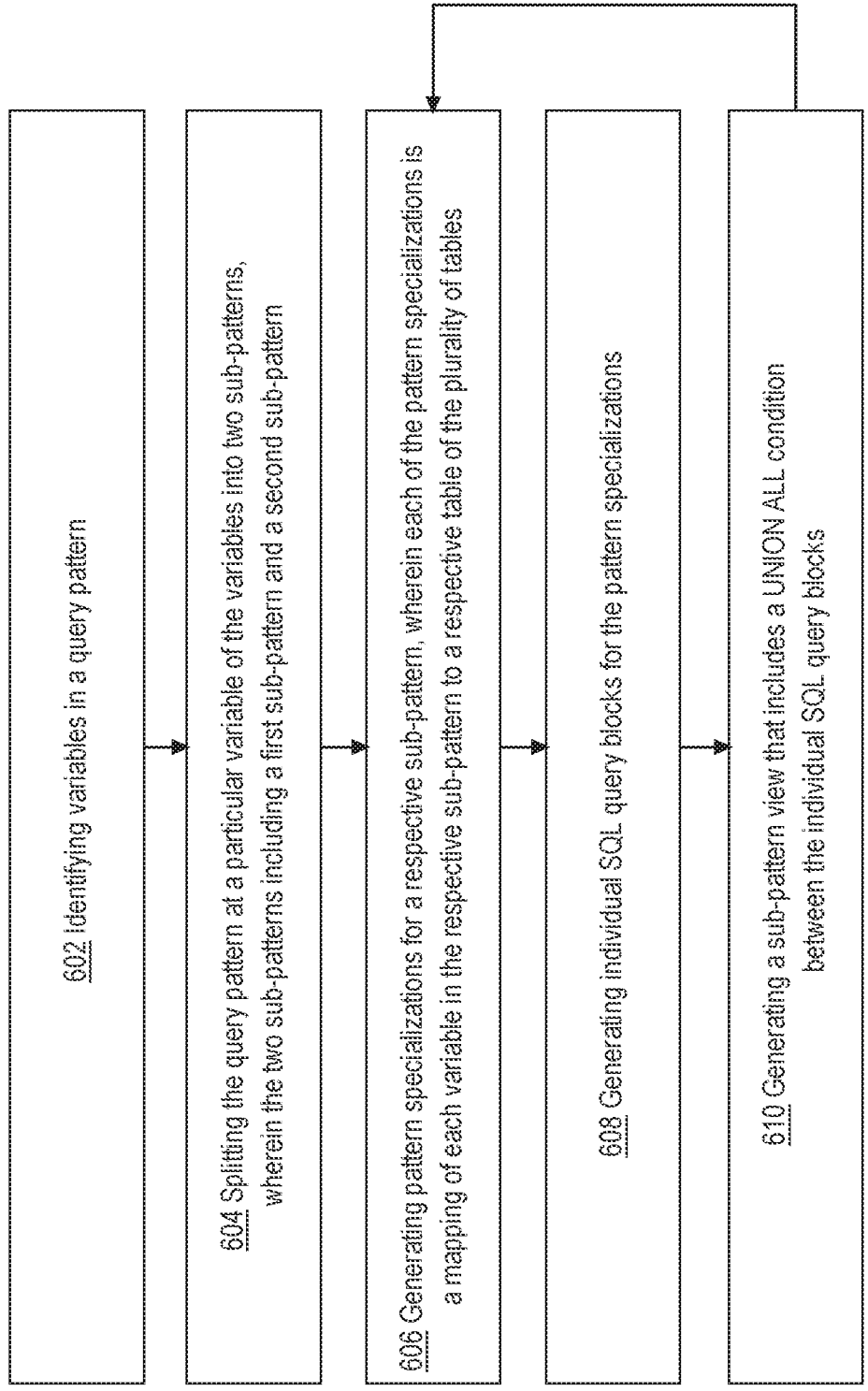
FIG. 6 illustrates an example flow diagram that depicts a process of limiting a number of UNION ALL query blocks in a SQL query.

FIG. 6 illustrates an example flow diagram that depicts a process 600 of limiting a number of UNION ALL query blocks in a main SQL query. The main SQL query is generated from a graph pattern query that includes a query pattern. The graph pattern query is issued against a heterogeneous graph having either vertices or edges stored in a plurality of tables. An example graph pattern query is shown in Table 3. At least two tables of the plurality of tables each store either vertices of the graph or edges of the graph. The graph is defined by a database dictionary of a relational database system. An example graph definition is shown in Table 2, At block 602, variables in the query patterned are identified.

At block 604, the query pattern is split at a particular variable of the variables, into two sub-patterns. The two sub-patterns include a first sub-pattern and a second sub-pattern. The particular variable may be bound to a particular table that is associated with a primary key. Alternatively, the particular variable may be bound to multiple tables of the plurality of tables, each of the multiple tables is associated with a primary key.

Steps described in blocks 606-610 are repeated for each of the two sub-patterns. At block 606, pattern generalizations for a respective sub-pattern are generated. Each of the pattern specializations is a mapping of each variable in the respective sub-pattern to a respective table of the plurality of tables. Examples of pattern generalizations are shown in Table 9.

At block 608, individual SQL query blocks for the pattern specializations are generated. An example individual SQL query block is shown in Table 13.

In an embodiment, the query pattern is split such that a number of pattern specializations for the first sub-pattern and a number of pattern specializations for the first sub-pattern are below a predetermined threshold.

At block 610, a sub-pattern view that includes a UNION ALL condition between the individual SQL query blocks is generated for the respective sub-pattern.

In an embodiment, the main SQL query includes a JOIN condition of the two sub-pattern views corresponding with the two sub-patterns.

In an embodiment, if the particular variable, at which the query pattern is split at, is bound to a particular (one) table of the plurality of tables, then each of the individual SQL query blocks of the two sub-pattern views includes a SELECT clause that includes a column specifying the particular table and a column specifying the primary key of a row in the particular table. The JOIN condition specifies that rows for an end vertex of the first sub-pattern and for a start vertex of the second sub-pattern are from the particular table and have the primary key for the particular table.

In an embodiment, if the particular variable, at which the query pattern is split at, is bound to multiple tables of the plurality of tables, then each of the individual SQL query blocks of the two sub-pattern views includes a SELECT clause that includes a column specifying a particular table of the multiple tables and a column specifying the primary key for each of the multiple tables. The JOIN condition specifies, for each of the multiple tables, that rows for an end vertex of the first sub-pattern and a start vertex of the second sub-pattern are from a respective table of the multiple tables and have the primary key for the respective table.

The main SQL query is executable by a relational database system to generate a result for the graph pattern query.

Enforcing Access Control During

Graph Pattern Matching Compilation

In a multi-user database environment, an implementation of a property graph may enforce access control using mechanisms similar to views. In order for a particular user to define a property graph, the particular user must have SELECT privileges on all tables used to define the property graph. The particular user may grant SELECT privilege on the property graph to a second user if the particular user has the SELECT privilege with GRANT OPTION on all the tables used to define the property graph.

Graph pattern matching queries over the property graph are executed in the context of the owner of the property graph. Privileges are enforced by the graph query compiler. In particular, the compiler verifies first that the issuer of a query has SELECT privilege on the property graph. If the issuer does not have SELECT privilege on the property graph, then an error may be generated. If the issuer has SELECT privilege on the property graph, then the privileges of the owner of the property graph are used to access information from the database dictionary. Once the graph pattern matching query has been transformed into an equivalent main SQL query, then the privileges of the owner of the property graph are used to compile the main SQL query into the final executable query plan.

Differences and Advantages

Techniques described herein include compiling the fixed length graph pattern matching query into efficient SQL. In an embodiment, this is done by firstly considering the graph as a first class citizen in the RDBMS. Then, the query is compiled and optimized using the native graph schema stored inside the RDBMS. The result is an efficient SQL query that can be executed on the original SQL engine of the RDBMS.

The techniques rely on a new property graph model or schema that is stored as a first class citizen inside the RDBMS. The property graph model is defined directly over the existing relational tables without any need of altering them. The property graph model can be defined over multiple data tables supporting thus heterogeneous graphs. The property graph model makes connections between data tables available to the compilation pipeline of graph queries allowing thus efficient pruning of invalid paths at compile time.

The techniques described herein are superior to prior approaches. For example, compared to in-memory based systems, the techniques described herein are not limited by the memory size of the machine. This is because the execution is based on SQL engine which takes advantage of the disk space.

For another example, compared to external specialized graph systems, the techniques described herein do not require data to be exported from the original RDBMS system, thus allowing execution to occur under the original security umbrella. In addition to security, the techniques preserve the same level of transactional support offered by the RDBMS and do not suffer for staleness of data.

For yet another example, compared to external translators, by exploiting the native graph schema, the techniques described herein achieve a much more performant SQL. This is because external translators do not take in account the heterogeneity in the graph data and the native graph structure of it. Thus, a big and costly ETL (Extract Transform Load) process is needed since all vertex tables are merged together into a large single vertex table and all edge tables are merged together into a large single edge table. When graphs are defined over multiple vertex and edge tables, this operation has a huge data movement cost, and existing statistics, indexes, partitions of the actual data tables are lost. In addition, external translators end up processing queries on a copy of a data. Since a copy is usually much bigger than the total size of the original data, queries are much more expensive to process. In addition, any transaction support that the RDBMS was offering is lost when queries are processed on a copy. External translators also do not offer optimizations such as path pruning.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create, configure and define database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

An SQL statement includes one or more query blocks. A query block is the basic unit of a SQL statement that specifies a projection operation (e.g. columns specified in a SELECT clause) on a row source (i.e. table, inline view, view referenced by a FROM clause), and may specify additional operations on the row source such as joining and grouping. A query block may be nested within another "outer" query block. A nested query block may be a subquery or inline view. A query block may be an argument to the UNION clause along with another query block, as illustrated by SQL statements described earlier.

A database is defined by a database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access or execute the database objects that are defined by the dictionary. Such database objects may be referred to herein as first class citizens of the database.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
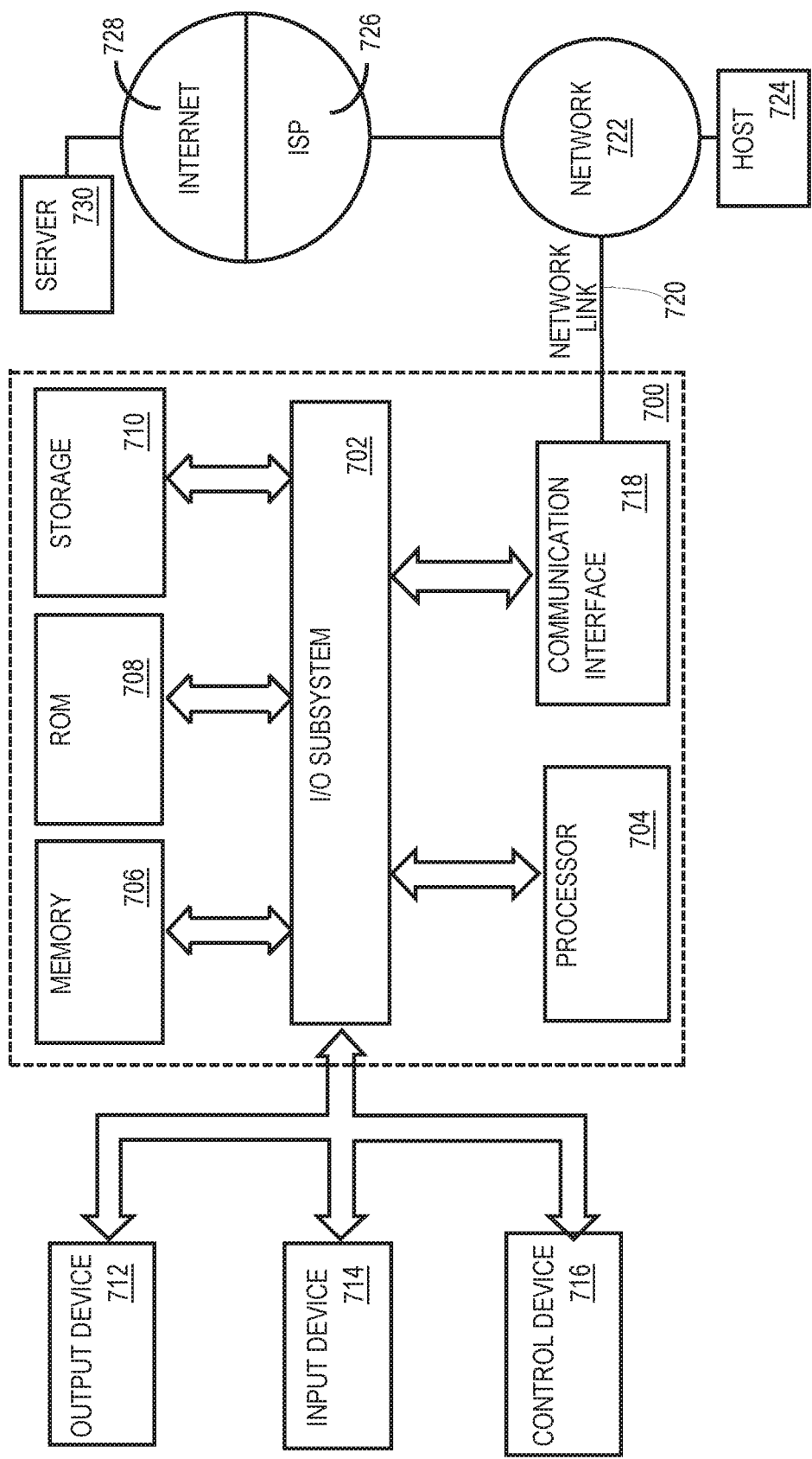
FIG. 7 illustrates a block diagram of a computing device in which the example embodiment(s) of the present invention may be embodiment.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 8:
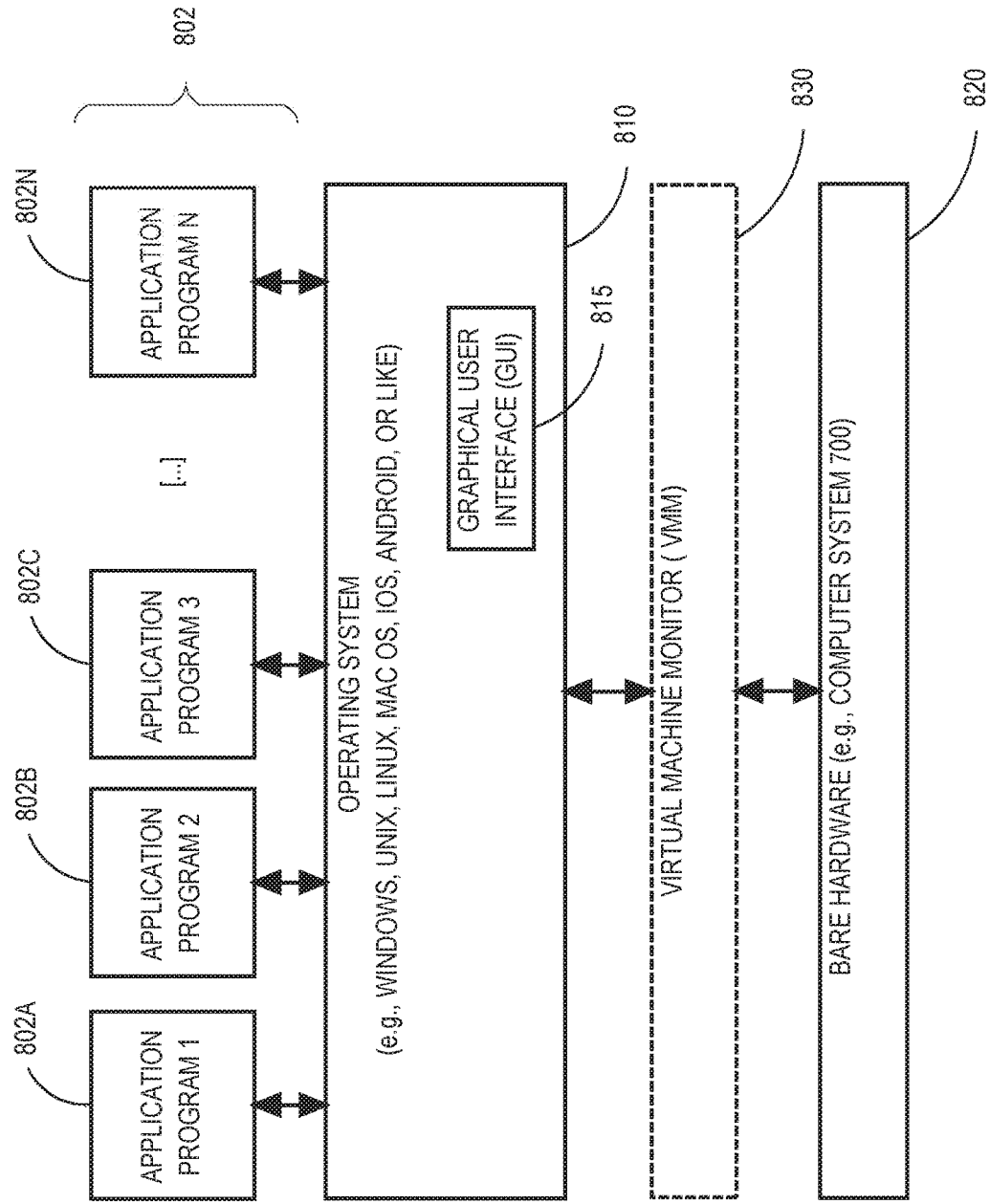
FIG. 8 illustrates a block diagram of a basic software system for controlling the operation of a computing device.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
executing a graph pattern query against a heterogenous graph having a plurality of vertices and a plurality of edges stored in a plurality of tables that includes a plurality of vertex tables that store rows representing the plurality of vertices;
wherein the graph pattern query includes a vertex identifier operator referencing vertices of the heterogenous graph;
wherein executing the graph pattern query includes generating a plurality of vertex identifiers that are returned as a result for the vertex identifier operator, wherein each vertex identifier of the plurality of vertex identifiers includes:
one or more values that identify a respective vertex and a single respective row in the plurality of vertex tables that represents the respective vertex;
a value that represents a respective table of said plurality of vertex tables that holds said single respective row;
wherein the plurality of vertex identifiers includes:
a first vertex identifier that identifies a first vertex, a first vertex table of said plurality of vertex tables, and a first row in said first vertex table, the first row in the first vertex table representing the first vertex, and
a second vertex identifier that identifies a second vertex, a second vertex table of said plurality of vertex tables, and a second row in said second vertex table of the plurality of vertex tables, the second row in the second vertex table representing the second vertex.

2. The method of claim 1, wherein the first vertex identifier specifies one or more primary key values stored in the first row in the first vertex table.

3. The method of claim 1, wherein the first vertex identifier includes a hierarchical object.

4. The method of claim 1, wherein the vertex identifier operator is typed for as conforming to hierarchical markup language.

5. The method of claim 4, wherein the hierarchical markup language is JSON.

6. The method of claim 1, wherein the graph pattern query specifies to group by the vertex identifier operator, wherein executing the graph pattern query includes grouping first vertices into a plurality of groups according to the vertex identifier operator by comparing table hash values of the plurality of vertex identifiers.

7. The method of claim 6, wherein the graph pattern query specifies an aggregate function, wherein executing the graph pattern query generates a plurality of arrays to return as a result of the aggregate function, each array of the plurality of arrays corresponding to a particular group of the plurality of groups and including an array element for each vertex in the particular group.

8. The method of claim 1, wherein the graph pattern query includes an edge identifier operator referencing edges of the heterogenous graph.

9. The method of claim 8, wherein the plurality of tables include a plurality of edge tables, wherein executing the graph pattern query further includes generating a plurality of edge identifiers that are returned as a result for the edge identifier operator, wherein each edge identifier of the plurality of edge identifier identifies a respective edge and a single respective row in the plurality of edge tables that represents the respective edge, wherein the plurality of edge identifiers includes:
a first edge identifier that identifies a first edge and a first row in a first edge table of the plurality of edge tables, the first row in the first edge table representing the first edge, and
a second edge identifier that identifies a second edge and a second row in a second edge table of the plurality of edge tables, the second row in the second edge table representing the second edge.

10. The method of claim 9, wherein the first edge identifier specifies the first edge table and one or more primary key values stored in the first row in the first edge table, wherein the first edge identifier includes a hierarchical object, wherein the edge identifier operator is typed for as conforming to hierarchical markup language.

11. A method comprising:
executing a graph pattern query against a heterogenous graph having a plurality of vertices and a plurality of edges stored in a plurality of tables, wherein at least two tables of the plurality of tables each store either vertices of the heterogenous graph or edges of the heterogenous graph;
wherein the graph pattern query includes a query pattern and an expression;
wherein executing the graph pattern query includes:
identifying variables in the query pattern;
generating a graph representation of the graph pattern query, wherein the graph representation is a collection of data structures representing the query pattern;
based on the graph representation, generating a first mapping of each variable of a set of variables in the graph pattern query to a respective label of a plurality of labels, each label of said plurality of labels corresponding to a respective table of said at least two tables;
wherein said first mapping maps a particular variable of said set of variables to:
a first label of said plurality of labels, said first label including a property, said property having a first data type for said first label;
a second label of said plurality of labels, said second label including said property, said property having a second data type for said second label that is different than said first data type;
after generating the first mapping, determining whether a UNION compatible type exists for the property that is compatible with the first data type and the second data type;
in response to determining that a UNION compatible type does not exist for the property that is compatible with the first data type and the second data type, generating an error.

12. The method of claim 11, wherein the heterogenous graph is defined by a database dictionary of a database system.

13. The method of claim 11, wherein determining whether a UNION compatible type exists for the property that is compatible includes:
determining said first data type and said second data type according to a graph definition.

14. The method of claim 11, wherein executing the graph pattern query further includes, in response to determining whether a UNION compatible type exists for the property that is compatible:

storing, in a property access node in an abstract syntax tree (AST) for the expression, the UNION compatible type for all types corresponding to all labels to which the particular variable is bound.

15. The method of claim 14, wherein the UNION compatible type is a JSON data type.

16. The method of claim 14, wherein executing the graph pattern query further includes, after storing, performing a SQL type-checker on the AST.

17. The method of claim 14, wherein executing the graph pattern query further includes, after storing:
generating a second mapping of each variable in the graph pattern query to a set of one or more tables of the plurality of tables, based on a label associated with a respective variable in the first mapping;
generating pattern specializations based on at least the second mapping;
generating individual SQL query blocks for the pattern specializations.

18. The method of claim 17, wherein executing the graph pattern query further includes, after generating the individual SQL query blocks, generating a main SQL query from the graph pattern query.

19. The method of claim 18, wherein the main SQL query includes a UNION ALL condition between the individual SQL query blocks.

20. The method of claim 18, wherein the main SQL query comprises a type cast of the property of the particular variable according to a type indicated at the property access node in the AST.

21. The method of claim 18, wherein the main SQL query comprises a type cast of an expression expanded from the property of the particular variable according to a type indicated at the property access node in the AST.

22. The method of claim 18, wherein the main SQL query is generated from the second mapping and the AST.

23. One or more computer-readable non-transitory media storing one or more sequences of instructions that, when executed by computing devices, cause:
executing a graph pattern query against a heterogenous graph having a plurality of vertices and a plurality of edges stored in a plurality of tables that includes a plurality of vertex tables that store rows representing the plurality of vertices;
wherein the graph pattern query includes a vertex identifier operator referencing vertices of the heterogenous graph;
wherein executing the graph pattern query includes generating a plurality of vertex identifiers that are returned as a result for the vertex identifier operator, wherein each vertex identifier of the plurality of vertex identifiers includes:
one or more values that identify a single respective row in a respective table of the plurality of vertex tables;
a value that represents said respective table of said plurality of vertex tables;
wherein the plurality of vertex identifiers includes:
a first vertex identifier that identifies a first vertex, a first vertex table of said plurality of vertex tables, and a first row in said first vertex table, the first row in the first vertex table representing the first vertex, and
a second vertex identifier that identifies a second vertex, a second vertex table of said plurality of vertex tables, and a second row in said second vertex table of the plurality of vertex tables, the second row in the second vertex table representing the second vertex.

24. The one or more computer-readable non-transitory media of claim 23, wherein the first vertex identifier specifies one or more primary key values stored in the first row in the first vertex table.

25. The one or more computer-readable non-transitory media of claim 23, wherein the first vertex identifier includes a hierarchical object.

26. The one or more computer-readable non-transitory media of claim 23, wherein the vertex identifier operator is typed for as conforming to hierarchical markup language.

27. The one or more computer-readable non-transitory media of claim 26, wherein the hierarchical markup language is JSON.

28. The one or more computer-readable non-transitory media of claim 23, wherein the graph pattern query specifies to group by the vertex identifier operator, wherein executing the graph pattern query includes grouping first vertices into a plurality of groups according to the vertex identifier operator by comparing table hash values of the plurality of vertex identifiers.

29. The one or more computer-readable non-transitory media of claim 28, wherein the graph pattern query specifies an aggregate function, wherein executing the graph pattern query generates a plurality of arrays to return as a result of the aggregate function, each array of the plurality of arrays corresponding to a particular group of the plurality of groups and including an array element for each vertex in the particular group.

30. The one or more computer-readable non-transitory media of claim 23, wherein the graph pattern query includes an edge identifier operator referencing edges of the heterogenous graph.

31. The one or more computer-readable non-transitory media of claim 30, wherein the plurality of tables include a plurality of edge tables, wherein executing the graph pattern query further includes generating a plurality of edge identifiers that are returned as a result for the edge identifier operator, wherein each edge identifier of the plurality of edge identifier identifies a respective edge and a single respective row in the plurality of edge tables that represents the respective edge, wherein the plurality of edge identifiers includes:
a first edge identifier that identifies a first edge and a first row in a first edge table of the plurality of edge tables, the first row in the first edge table representing the first edge, and
a second edge identifier that identifies a second edge and a second row in a second edge table of the plurality of edge tables, the second row in the second edge table representing the second edge.

32. The one or more computer-readable non-transitory media of claim 31, wherein the first edge identifier specifies the first edge table and one or more primary key values stored in the first row in the first edge table, wherein the first edge identifier includes a hierarchical object, wherein the edge identifier operator is typed for as conforming to hierarchical markup language.

33. One or more computer-readable non-transitory media storing one or more sequences of instructions that, when executed by computing devices, cause: comprising:
executing a graph pattern query against a heterogenous graph having a plurality of vertices and a plurality of edges stored in a plurality of tables, wherein at least two tables of the plurality of tables each store either vertices of the heterogenous graph or edges of the heterogenous graph;

wherein the graph pattern query includes a query pattern and an expression;
wherein executing the graph pattern query includes:
  identifying variables in the query pattern;
  generating a graph representation of the graph pattern query, wherein the graph representation is a collection of data structures representing the query pattern;
  based on the graph representation, generating a first mapping of each variable of a set of variables in the graph pattern query to a respective label of a plurality of labels, each label of said plurality of labels corresponding to a respective table of said at least two tables;
  wherein said first mapping maps a particular variable of said set of variables to:
    a first label of said plurality of labels, said first label including a property, said property having a first data type for said first label;
    a second label of said plurality of labels, said second label including said property, said property having a second data type for said second label that is different than said first data type;
  after generating the first mapping, determining whether a UNION compatible type exists for the property that is compatible with the first data type and the second data type;
  in response to determining that a UNION compatible type does not exist for the property that is compatible with the first data type and the second data type, generating an error.

34. The one or more computer-readable non-transitory media of claim 33, wherein the heterogenous graph is defined by a database dictionary of a database system.

35. The one or more computer-readable non-transitory media of claim 33, wherein determining whether a UNION compatible type exists for the property that is compatible includes:
  determining said first data type and said second data type according to a graph definition.

36. The one or more computer-readable non-transitory media of claim 33, wherein executing the graph pattern query further includes, in response to determining whether a UNION compatible type exists for the property that is compatible:
  storing, in a property access node in an abstract syntax tree (AST) for the expression, the UNION compatible type for all types corresponding to all labels to which the particular variable is bound.

37. The one or more computer-readable non-transitory media of claim 36, wherein the UNION compatible type is a JSON data type.

38. The one or more computer-readable non-transitory media of claim 36, wherein executing the graph pattern query further includes, after storing, performing a SQL type-checker on the AST.

39. The one or more computer-readable non-transitory media of claim 36, wherein executing the graph pattern query further includes, after storing:
  generating a second mapping of each variable in the graph pattern query to a set of one or more tables of the plurality of tables, based on a label associated with a respective variable in the first mapping;
  generating pattern specializations based on at least the second mapping;
  generating individual SQL query blocks for the pattern specializations.

40. The one or more computer-readable non-transitory media of claim 39, wherein executing the graph pattern query further includes, after generating the individual SQL query blocks, generating a main SQL query from the graph pattern query.

41. The one or more computer-readable non-transitory media of claim 40, wherein the main SQL query includes a UNION ALL condition between the individual SQL query blocks.

42. The one or more computer-readable non-transitory media of claim 40, wherein the main SQL query comprises a type cast of the property of the particular variable according to a type indicated at the property access node in the AST.

43. The one or more computer-readable non-transitory media of claim 40, wherein the main SQL query comprises a type cast of an expression expanded from the property of the particular variable according to a type indicated at the property access node in the AST.

44. The one or more computer-readable non-transitory media of claim 40, wherein the one or more sequences of instructions include instructions that, when executed by one or more computing devices, cause the main SQL query to be generated from the second mapping and the AST.

* * * * *

UNITED STATES PATENT AND TRADEMARK OFFICE
CERTIFICATE OF CORRECTION

| | | |
|---|---|---|
| PATENT NO. | : 11,989,178 B2 | |
| APPLICATION NO. | : 17/080700 | |
| DATED | : May 21, 2024 | |
| INVENTOR(S) | : Haprian et al. | |

It is certified that error appears in the above-identified patent and that said Letters Patent is hereby corrected as shown below:

On the Title Page

On page 2, Column 2, item (56) under Other Publications, Line 1, delete "Yousti," and insert -- Yousfi, --, therefor.

On page 2, Column 2, item (56) under Other Publications, Line 32, delete ""Graphs" and insert -- "Graph --, therefor.

On page 2, Column 2, item (56) under Other Publications, Line 35, delete "Grpah" and insert -- Graph --, therefor.

On page 3, Column 1, item (56) under Other Publications, Line 22, delete ""Extended" and insert -- "Extending --, therefor.

In the Specification

In Column 8, Line 55, delete "person)" and insert -- person). --, therefor.

In Column 28, Line 32, delete "Table 2," and insert -- Table 2. --, therefor.

In Column 32, Line 40, delete "and or" and insert -- and/or --, therefor.

In the Claims

In Column 40, Line 65, in Claim 33, delete "cither" and insert -- either --, therefor.

Signed and Sealed this
First Day of October, 2024

Katherine Kelly Vidal
*Director of the United States Patent and Trademark Office*